United States Patent
Myers et al.

(10) Patent No.: US 7,320,389 B1
(45) Date of Patent: Jan. 22, 2008

(54) THREE-AXIS OFFSET DAMPING SYSTEM

(75) Inventors: James R. Myers, Altamonte Springs, FL (US); Roger W. Graves, Orlando, FL (US); George Go, Orlando, FL (US); Thomas E. Higgins, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 515 days.

(21) Appl. No.: 10/818,894

(22) Filed: Apr. 5, 2004

Related U.S. Application Data

(60) Provisional application No. 60/460,281, filed on Apr. 3, 2003.

(51) Int. Cl.
*F16F 7/10* (2006.01)
(52) U.S. Cl. .................................................. 188/380
(58) Field of Classification Search ................ 188/378, 188/379, 380
See application file for complete search history.

(56) References Cited

U.S. PATENT DOCUMENTS

| | | | | |
|---|---|---|---|---|
| 3,592,422 A * | 7/1971 | Paine et al. | ................. | 248/589 |
| 3,794,277 A * | 2/1974 | Smedley et al. | ............ | 248/548 |
| 5,348,124 A * | 9/1994 | Harper | ....................... | 188/378 |
| 5,538,373 A * | 7/1996 | Kirkham | ..................... | 409/131 |
| 5,803,213 A * | 9/1998 | Davis et al. | ................. | 188/378 |
| 5,918,865 A * | 7/1999 | Osterberg | .................... | 267/221 |
| 6,029,959 A * | 2/2000 | Gran et al. | ................. | 267/136 |
| 6,059,253 A * | 5/2000 | Koutsky et al. | ............ | 248/550 |
| 6,474,915 B1 * | 11/2002 | Wildenberg | ................. | 409/201 |
| 2003/0075407 A1* | 4/2003 | Taylor | ........................ | 188/380 |
| 2003/0132077 A1* | 7/2003 | Davis | ......................... | 188/380 |

* cited by examiner

*Primary Examiner*—Devon Kramer
(74) *Attorney, Agent, or Firm*—Jeffrey D. Myers; Timothy D. Stanley; Peacock Myers, P.C.

(57) ABSTRACT

The present invention comprises a three-axis damping system employing dampers and springs in spatially oriented arrays to isolate an object against translational forces in any direction as well as rotational forces. The inventive system also is biased in the vertical static position to compensate for gravity.

18 Claims, 21 Drawing Sheets

|  | VERTICAL | | LONGITUDINAL | | LATERAL | |
|---|---|---|---|---|---|---|
|  | NATURAL f (Hz) | DAMPING (%) | NATURAL f (Hz) | DAMPING (%) | NATURAL f (Hz) | DAMPING (%) |
| 14 SPRINGS/SIDE | 8.28 | 1.8 | 8.125 | 2.4 | 7.81 | 2 |
| 14 SPRINGS/SIDE WITH 14 DAMPERS/SIDE (80W) | 12.5 | 13 | 9.7 | 14 | 11.25 | 13 |
| 14 SPRINGS/SIDE WITH 14 DAMPERS/SIDE (50W) | 13.28 | 13 | NO DATA | NO DATA | 11.88 | 13 |
| 7 WINDOW ISOLATOR PLATES |  |  |  |  |  |  |
| 84.1 lb PAYLOAD |  |  |  |  |  |  |
| ASSOCIATED P/N E0500-075-1750S |  |  |  |  |  |  |
| K=37.7lb/inch |  |  |  |  |  |  |

*FIG. 14*

THREE-AXIS OFFSET DAMPING SYSTEM

CROSS-REFERENCE TO RELATED APPLICATIONS

This application claims the benefit of the filing of U.S. Provisional Patent Application Ser. No. 60/460,281, entitled "Three-Axis Offset Damping System," filed on Apr. 3, 2003, and the specification thereof is incorporated herein by reference.

GOVERNMENT RIGHTS

The U.S. Government has certain rights to this application and invention pursuant to the terms of Contract No. N-000-19-96C-0128 awarded by the United States Navy

BACKGROUND OF THE INVENTION

1. Field of the Invention (Technical Field)

The present invention relates to an apparatus for physically isolating delicate or sensitive instrumentation systems, particularly to a damping apparatus for isolating items or systems from abrupt and potentially destructive accelerations.

2. Background Art

There are a variety of contexts in which it is desirable to physically isolate items against potentially destructive movements, particularly rapid accelerations. For example, it is desirable to physically isolate certain delicate instrumentation in aircraft and missiles, so to minimize the effects of rapid accelerations upon the instruments. The rapid accelerations resulting from abrupt changes in speed and/or direction of movement may adversely affect the performance of, or even damage, certain critical devices or systems.

Conventional three-axis isolation systems known in the field of avionics employ steel springs to accomplish physical isolation of delicate or sensitive systems. Standard spring-biased systems, however, typically offer little or no damping. For example, there are known TSS Wescam® gimbal systems that are used primarily on police and movie industry helicopters. These systems use a steel spring and rope systems for isolating cameras. Such systems are not adequate in, for example, harsh military environments, where it is difficult to control the isolated mass of the sensor. Ordinarily, known spring-biased systems are provided with rubber isolators to give minimal damping characteristics. These known devices perform satisfactorily generally only in thermally stable environments. Further, known rubber damper devices have limited capabilities when sway space is at a premium or minimal.

Certain avionics systems, when in use, are situated in circumstances of minimal sway space, and in environments where temperatures may vary over a relatively wide range. Known rubber isolator devices are inadequate under such conditions. For example, in military applications, there is a need for fine line-of-sight pointing accuracy while controlling the sensor, despite harsh environmental conditions. A need remains for a damper system for motion-sensitive avionics systems, particularly systems that require fine pointing accuracies, which are situated in confined conditions of widely variable environmental temperature.

SUMMARY OF THE INVENTION

DISCLOSURE OF THE INVENTION

The invention comprises a three-axis damping apparatus for isolating an object from the unwanted effect of forces. The apparatus comprises at least one array of a plurality of shock absorbing dampers interconnected to at least one array of a plurality of shock absorbing springs to form at least one isolator assembly and further comprises a yoke on which to attach the isolator assembly.

The apparatus may comprise two isolator assemblies, and the yoke may comprise two yoke arms spaced apart from each other at a distance determined on the basis of the size of the object to be disposed and protected between the isolator assemblies. The isolator assemblies are disposed in parallel orientation to each other, and the yoke arms are adjustably spaced apart at a distance.

The isolator assemblies each further comprise an outer isolator plate disposed adjacent to, and in generally parallel and spaced apart relation to, an inner isolator plate. The array of dampers and the array of springs connect the outer isolator plate to the inner isolator plate. The isolator plates are arranged vertically. Each outer isolator plate is connected to one of the yoke arms and each said inner isolator plate is securely and releasably connected to the object to be protected.

The difference of the distance between the outer isolator plates and the distance between the inner isolator plates divided by a factor of two may be approximately equal to the distance between each outer isolator plate and each adjacent inner isolator plate. The separation of the yoke arms holds the outer isolator plates apart from the inner isolator plates connected to the object to be protected so that the tension of the springs is set. The springs and the dampers are arranged to insulate the inner isolation plates from movement of said outer isolation plates. The dampers ameliorate the rebound effects of the springs.

The invention further comprises a damping isolator assembly comprising an outer isolation plate comprising a hub, an inner isolation plate comprising a hub, and a plurality of dampers and a plurality of springs connected to the outer isolator plate and to the inner isolator plate thereby connecting the outer isolator plate to the inner isolator plate.

The outer isolator plate hub and the inner isolator plate hub are disposed in offset relation to each other to compensate for the action of gravity on the isolator assembly. Further, the outer isolation plate comprises a plurality of ring ridges and corresponding features disposed in an offset relation to the isolator plate's central axis by a distance approximately equal to the anticipated shifting distance resulting from the weight of a payload.

The dampers may be hydraulic, and the dampers are disposed in pairs adjacent to a pair of the springs. The invention may also comprise a plurality of outer mounts for mounting the dampers to the outer isolator plate and a plurality of inner mounts for mounting the dampers to the inner isolator plate. The dampers connect from one end to the outer mounts and connect from the opposite end to the inner mounts. The dampers are pivotally connected to the inner isolator plate. The hub of the inner isolator plate is connected between the inner damper mount and the inner isolator plate.

The invention may further comprise a snubber to protect against collision between the outer isolator plate and the inner isolator plate, and may be of rubber.

The invention further comprises a method for isolating and protecting an object from the unwanted effect of forces by disposing the object between isolator assemblies and connecting the isolator assemblies to a yoke which may comprise two arms on for disposing the isolator assemblies between the two arms.

The method also comprises constructing each isolator assembly by providing an outer isolator plate, an inner isolator plate, and springs and dampers to connect the outer isolator plate to the inner isolator plate.

The objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 14 is a table setting forth the response of the inventive system in the vertical, longitudinal, and lateral axes, by natural frequency and damping percent, at 6 db transmissibility and either 50 W or 80 W oil in the dampers, for a particular vibratory condition;

DESCRIPTION OF THE PREFERRED EMBODIMENTS

BEST MODES FOR CARRYING OUT THE INVENTION

The present invention relates to a three-axis damping system employing small hydraulic shock absorbers. The shock absorbing dampers are spatially oriented in a unique array to provide damping in any translating direction as well as in rotation. The inventive system also is biased in the vertical static position to compensate for gravity. The apparatus according to the invention provides a high degree of quality damping in an isolation system within a confined space. The invention retains its optimal damping capability over a wider temperature range than any conventional; "elastic" solution. The apparatus finds practical use in a variety of contexts where it is desirable to isolate motion-sensitive devices from deleterious accelerations. It is contemplated that the invention has beneficial application in advanced avionic systems that require fine pointing accuracy under harsh environmental conditions.

The inventive system provides high quality damping in three-axis translation and rotation. The system incorporates small hydraulic shock absorbers to provide the quality damping. The shock-absorbing hydraulic dampers have ball end joints for free pivoting and rotation to accommodate relative motion and to compensate for misalignments. The apparatus of the invention may be fashioned from a durable, rigid material suitable to the particular application; the various components may be machined, for example, from aluminum, stainless steel, or molybdenum alloys or the like, according to need.

Figure 1:
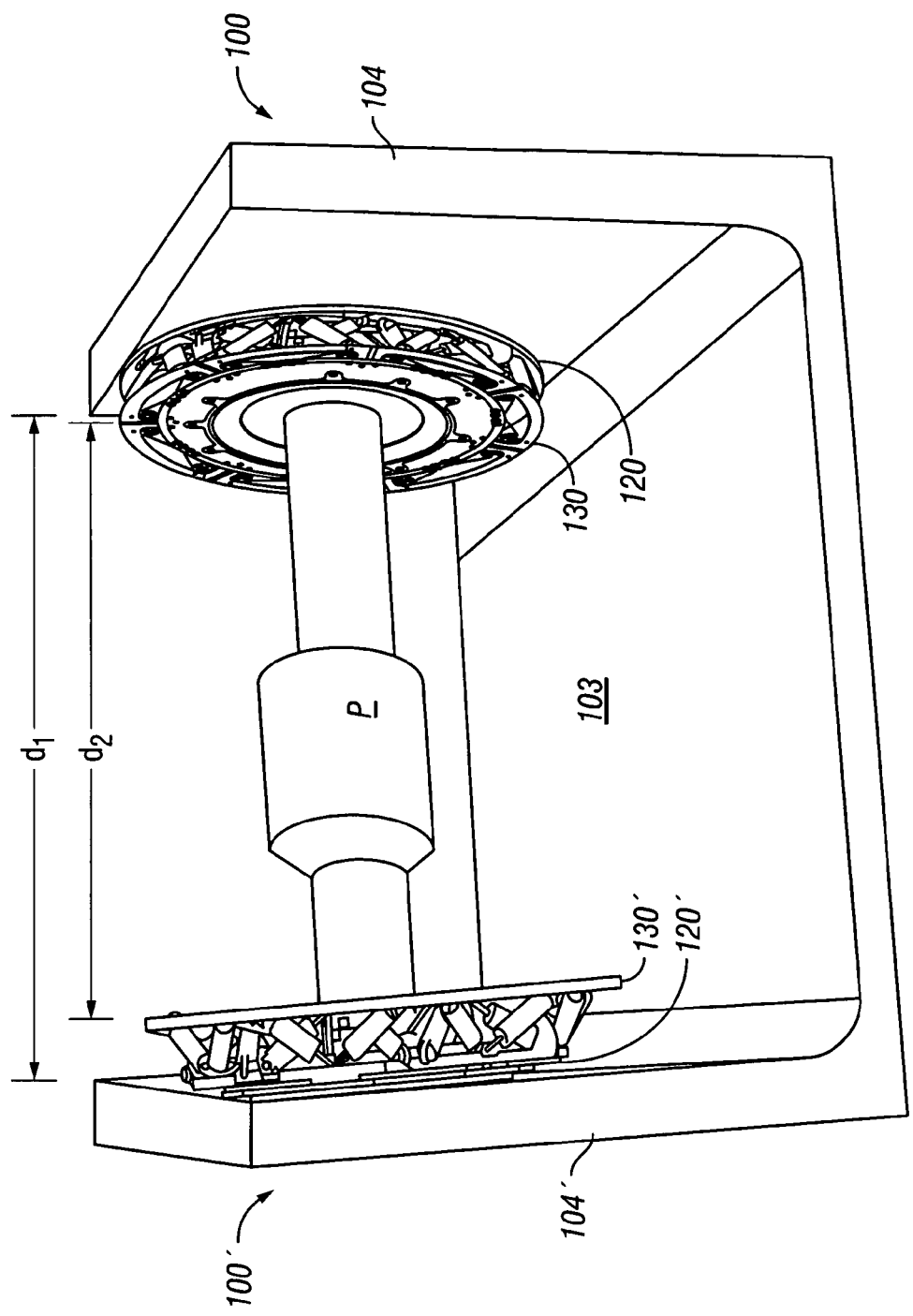
FIG. 1 is a side perspective view of the apparatus of the invention in context for use.

FIG. 1 shows the apparatus of the invention in an instance of use, and provides context for the further disclosures herein. There is a payload P which is to be isolated against destructive shocks and accelerations. The apparatus of the invention includes a pair of isolator assemblies 100, 100' which serve this advantageous isolation function. It is desired to insulate the payload P against abrupt accelerations in any translational direction, including longitudinal (i.e. axially toward either of the assemblies 100, 100'), as well as against deleterious rotations.

According to the invention, a yoke 103 is provided in which the assemblies 100, 100' are situated. The yoke 103 may be mounted in an aircraft or other vehicular platform. Yoke 103 has arms 104, 104' that are spaced apart at a distance, their distance of separation being selected according to the size of the payload P and assemblies 100, 100' implemented in the circumstance. While a given yoke 103 may have a base separation distance $d_1$ that is adjustable between uses, the separation distance $d_1$ is always securely fixed during any particular use of the invention.

The isolator assemblies 100, 100' are each secured, as by bolting, to a respective one of the yoke arms 104, 104'. The assemblies 100, 100' are each comprised of an outer isolator plate 120, 120' and an inner isolator plate 130, 130'. The inner isolator plates 130, 130' are securely, although releasably, connected to the payload P or other item to be isolated.

Each inner isolator plate 130 or 130' are in close adjacency with a corresponding outer isolator plate 120, 120', but adjacent isolator plates (e.g. 120, 130) are maintained in spaced apart relation. The variability of the spacing distance between adjacent isolator plates serves to physically insulate the payload P. As disclosed further herein, adjacent isolator plates (e.g. 120, 130 and 120', 130') are interconnected by extension springs and hydraulic dampers which regulate their relative motion. The payload P and its mounts define an inner isolation plate separation distance $d_2$ which, after accounting for the thickness of the isolator plates 120, 130, 120', 130' is less than the base separation distance $d_1$ so to maintain adjacent isolator plates in spaced relation. Thus, base separation distance $d_1$ minus the inner plate separation distance $d_2$, divided by two, is approximately equal to the spacing distance between adjacent isolator plates. The adjacent isolator plates 120, 130, and 120', 130' are connected by extension springs (in tension) and hydraulic dampers, as shall now be further described.

FIGS. 1A, 1B, 2A and 2B illustrate the general configurations of preferred embodiments of a pair of isolator assemblies 100, 100' according to the invention, usable in certain avionics applications. The assemblies 100, 100' may find beneficial use singly, but extremely preferably in pairs, e.g., the payload or other item to be isolated is disposed in contact with, and intermediate to, two assemblies 100, 100' disposed in parallel. The right assembly 100 features two isolator plates, an outer isolator plate 120 and an inner isolator plate 130, that are disposed in generally parallel relation and movably connected by various other smaller components of the apparatus as shall be further described. The left assembly 100' is substantially the same in configuration and function to the right assembly 100, except as specifically noted herein. In normal use, the assemblies 100, 100' are situated with the isolator plates 120, 130, 120', 130' arranged vertically, as depicted in the figures. The object to be isolated (FIG. 1) is then disposed horizontally between the two assemblies 100, 100', which are spaced apart, with their respective inner isolator plates 130, 130' in confronting relation, a suitable distance to accommodate the object. The object to be isolated is attachable to the inner isolator plates. The assemblies 100, 100' themselves are respectively anchored, by the outer isolator plates 130, 130', to the yoke which is mounted in the vehicle or platform in use.

In sum, the separation of the yoke arms 104,104' effectively holds adjacent isolator plates apart, and sets the spring tension. An offset, further described herein, in the hubs of the isolator plates compensates for gravity; there is a slight sag in the extension springs when the payload is attached. Thus, the isolator plate hubs are offset under no load, and go to the center of travel when the payload is installed.

Reference to FIGS. 1A, 1B, 2A and 2B show, in addition to the outer isolator plates 120, 120' and inner isolator plates 130, 130', the arrangement of the array of extension springs 132, 132', 132" and hydraulic dampers 142, 142', 142". The springs and dampers are specially arranged to insulate the inner isolation plates 130, 130' from any jarring movement of the outer isolation plates 120, 120', as further disclosed herein.

Figure 3:
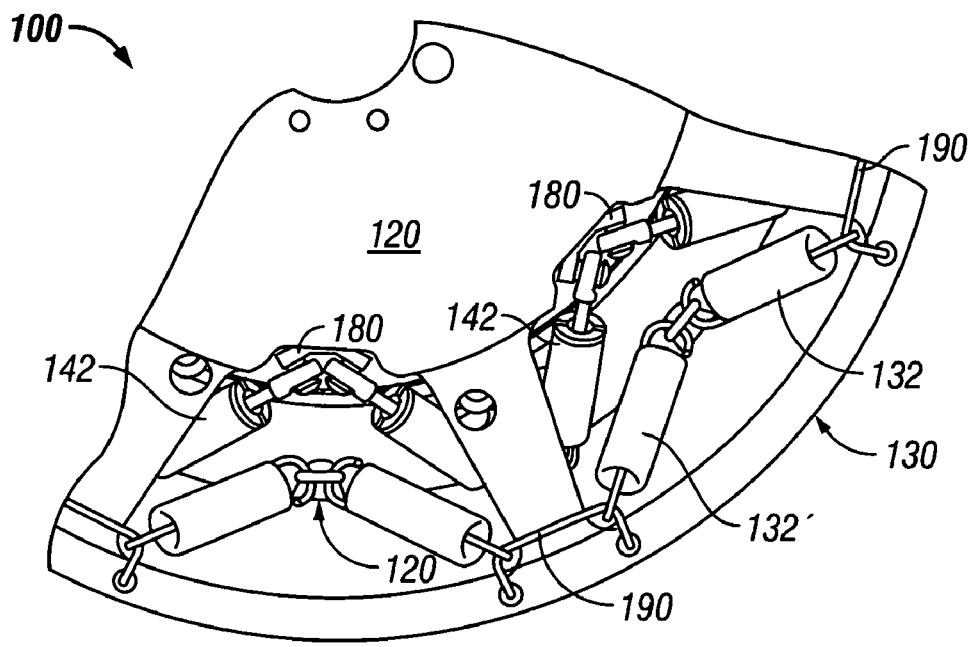
FIG. 3 is an enlarged partial view of the apparatus of the invention as shown in FIG. 1A.
Figure 4:
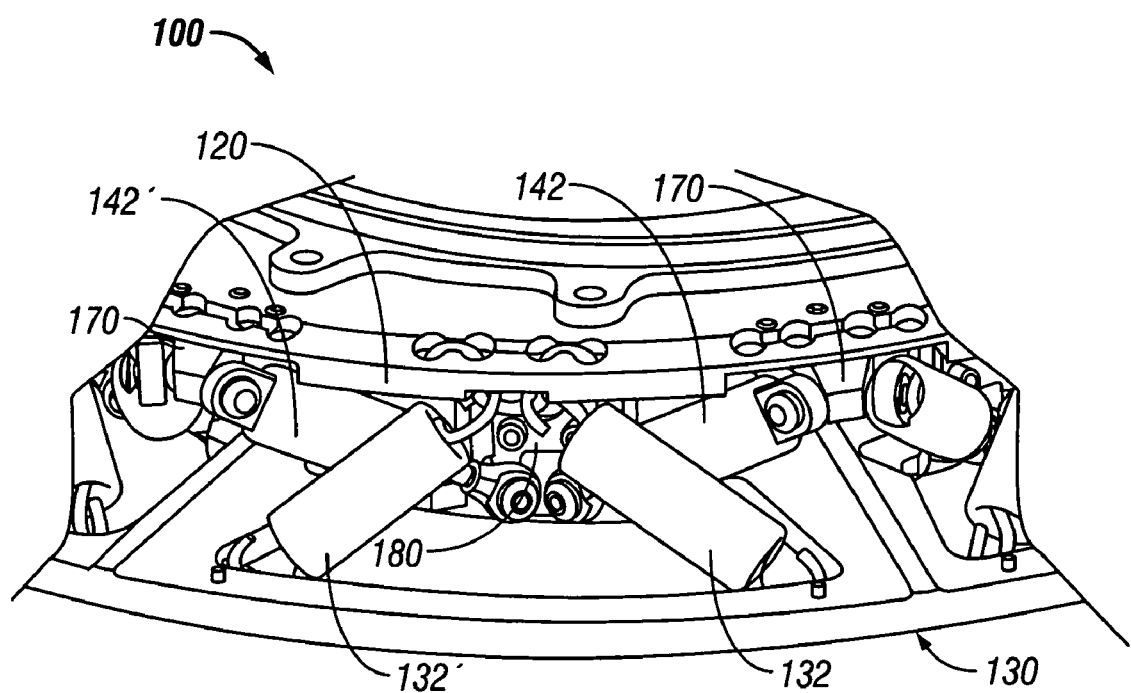
FIG. 4 is the enlarged partial view seen in FIG. 3, rotated to show additional components of the apparatus.

Attention is invited to FIGS. 3 and 4, showing, in enlarged partial views, that an isolator assembly 100 has the outer isolator plate 120 disposed generally parallel to the inner isolator plate 130. FIG. 3 is an inside normal view of the isolator assembly 100, whereby the system to be isolated (not shown) is mounted, e.g. by bolting, to the inner isolator plate 130. As seen in the figures, translational and rotational isolation of the inner isolator plate 130 in relation to the outer isolator plate 120 is provided by the plurality (preferably fourteen) of extension springs 132, 132'. The figures also depict four of the plurality of hydraulic dampers 142, 142' according to the invention connecting the inner isolator plate 130 to the outer isolator plate 120. Adjacent pairs of dampers are connected to the outer isolator plate 120 by means of custom outer damper mounts 170 (FIG. 4), to be further described, attached to the outer isolator plate 120. In the preferred embodiment, fourteen dampers 142 are attached using seven outer damper mounts 170. The ends of the dampers opposite from the outer damper mounts are connected to the inner isolator plate 130 by means of inner damper mounts 180 (FIG. 3), also preferably seven in number and to be further described herein, attached to the inner isolator plate 130.

Figure 5A:
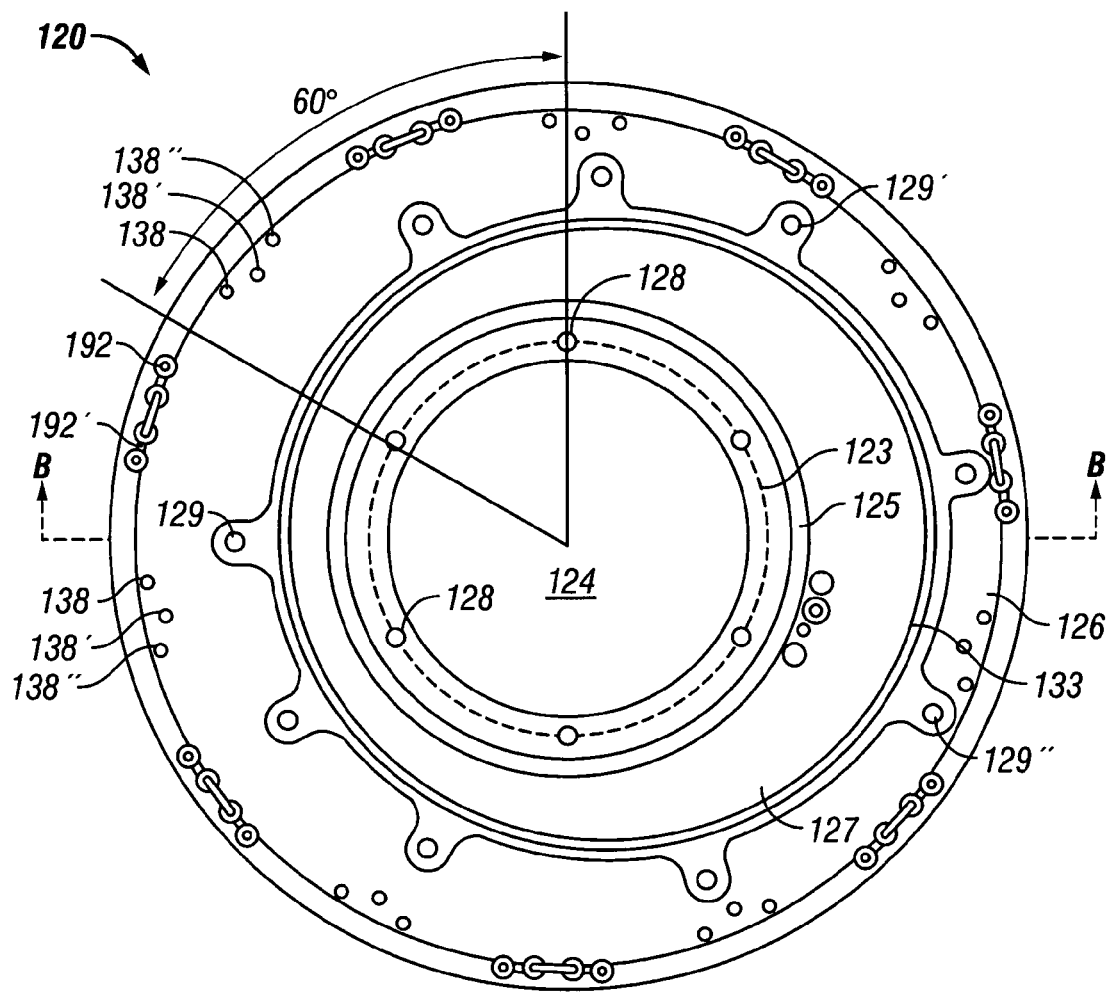
FIG. 5A is an outside end (axial) view of an outer right isolator plate according to the apparatus of the invention.
Figure 5B:
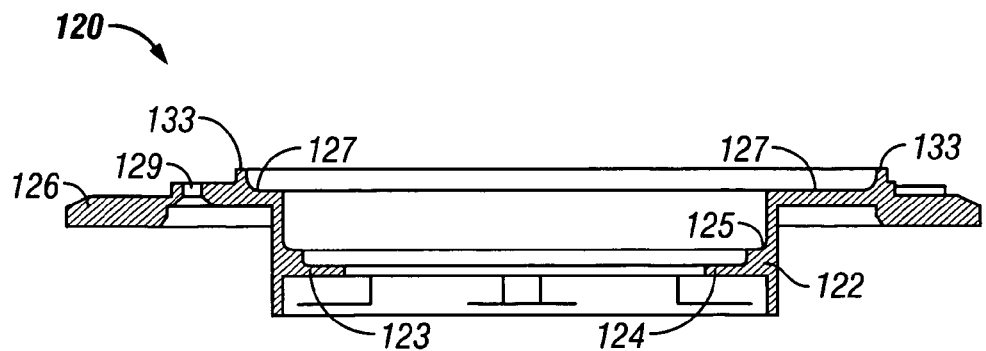
FIG. 5B is a side sectional view of the isolator plate shown in FIG. 5A, taken along section line B-B in FIG. 5A.
Figure 6A:
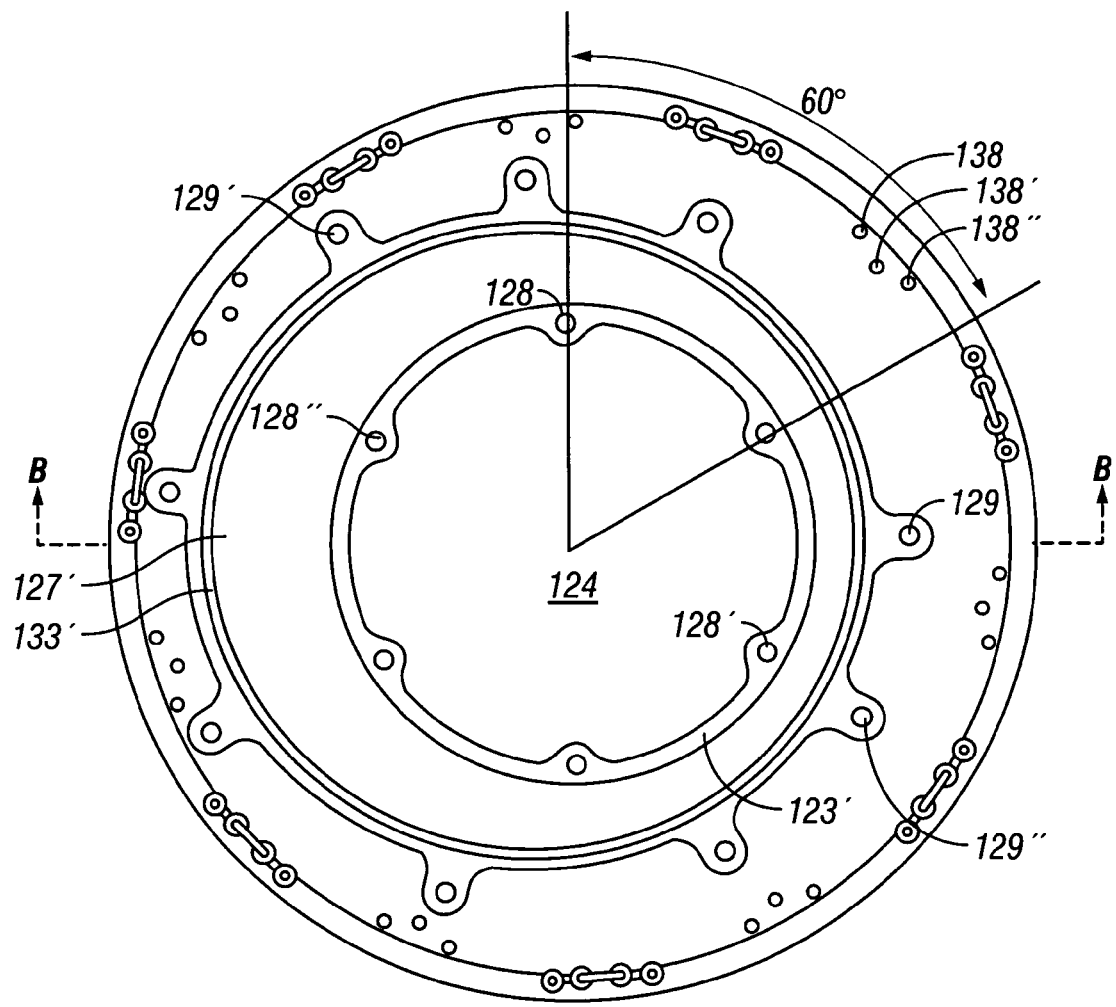
FIG. 6A is an outside end (axial) view of an outer left isolator plate according to the apparatus of the invention.
Figure 6B:
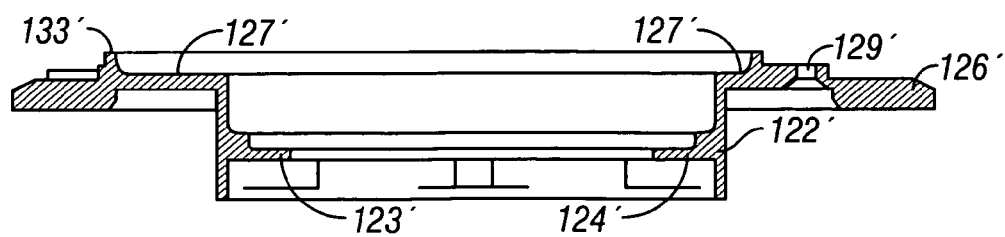
FIG. 6B is a side sectional view of the isolator plate shown in FIG. 6A, taken along section line B-B in FIG. 6A.

The preferred configuration of the right outer isolator plate 120, for construction of the right isolator assembly 100, is depicted in FIGS. 5A and 5B. The very similar left outer isolator plate 120' is depicted in FIGS. 6A and 6B. Like portions of the respective isolator plates 120, 120' are identified using like numerical labels; description of the right outer isolator plate 120 thus serves to describe corresponding portions of the left outer isolator plate 120'. The outer isolator plates 120, 120' may be sized according to need, and may have an outside diameter (as defined by outer flange 126) of, for example, approximately nine inches. Outer isolator plates 120, 120' preferably are machined from aluminum alloy 6061-T651 or suitable alternatives.

Somewhat disk-like outer isolator plate 120 features a generally cylindrical hub 122 having a principal inside diameter of, for example, about 4.8 inches. Extending radially inward from the hub 122 is an annular inner flange 123 defining a circular axial aperture 124 completely penetrating the plate 120. Axial aperture may have a diameter of, for example, about 3.6 inches. The inner flange 123 also defines on its upper surface a shoulder 125, so that the inner wall of the hub 122 above the inner flange defines a basin having a deep (e.g. about 0.84 inch) upper portion above a shallower (e.g. 0.16 inch) lower portion, the lower portion having a comparatively smaller diameter (e.g. approximately 4.4 inches), as seen in FIGS. 5A and 5B. The annulus of the inner flange 123 is penetrated between the shoulder 125 and the axial aperture 124 by an array of six (preferably) equally spaced fastener apertures 128, 128' as seen in FIG. 5A. Below the inner flange 123, the inner wall of the hub 122 defines an inverted basin having a diameter (e.g. approximately 4.8 inches) corresponding to the upper portion of the upper basin.

Extending radially outward from the upper portion of the hub 122 is an annular outer flange 126. The disk-like outer flange 126 has the stylized cross section illustrated in FIG. 5B. Protruding upward from the outer flange 126 is circular ring ridge 133, which defines the upper table 127 on the upper surface of the flange 126. As indicated in the figures, the ring ridge 133 is not coaxial with the hub 122. The definitional axis of the ring ridge 133 is parallel to, but offset from, the axis of the hub 122 by, for example, approximately 14% of the radius of the ring ridge 133. Thus, as best seen in FIG. 5A, the table 127 is off-center from the hub 122 in a cam-like manner, with the table 127 being broader on one side of the hub's axis than on the other side. The outer flange 126 is penetrated by nine non-equally space apertures 129, 129', 129" in the circumferential array shown in FIGS. 5A and 6A, which may be used to secure the assembly 100 to the yoke 103 (FIG. 1). In the preferred embodiment, the outer flange 126 also features a plurality, preferably seven, equally spaced groups of three connection apertures 138, 138', 138", also as seen in FIGS. 5A and 6A. Connection apertures 138, 138', 138'" are employed in the connection of the hydraulic dampers 142, 142' to the outer isolator plate 120, as further disclosed hereafter.

Reference to FIGS. 6A and 6B shows that the left outer isolator plate 120' is substantially similar to the right outer isolator plate 120. It is a reflection, with the ring ridge 133' offset in a complementary direction from that of the right outer isolation plate 120. Further, as seen in FIG. 6B, the inner flange 123' extends inwardly from the wall of the hub 122', but at a medial vertical position so as to divide the interior of the interior of the hub more nearly in half, with the upper basin being not quite as deep as the inverted lower basin. The inner flange 123' defines the axial aperture 124. The overall principal dimensions of the various features of the left outer isolation plate correspond generally to those of the right outer isolation plate 120.

Figure 7B:
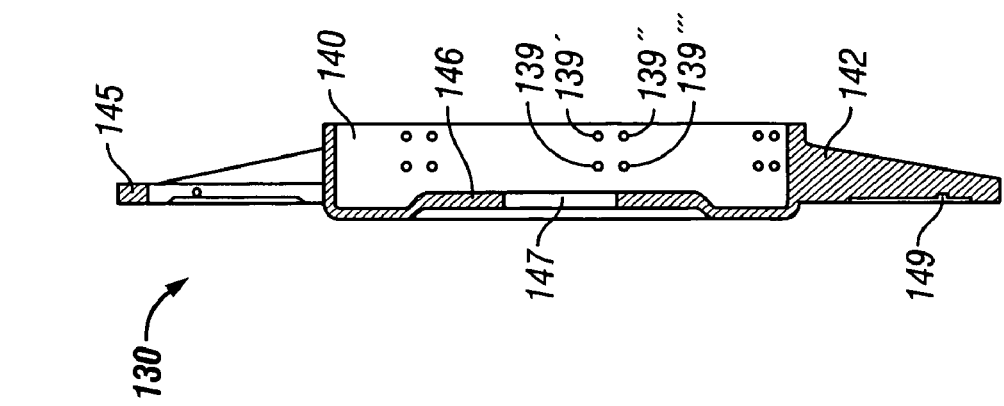
FIG. 7B is a side sectional view of the isolator plate shown in FIG. 7A, taken along section line B-B in FIG. 7A.
Figure 7A:
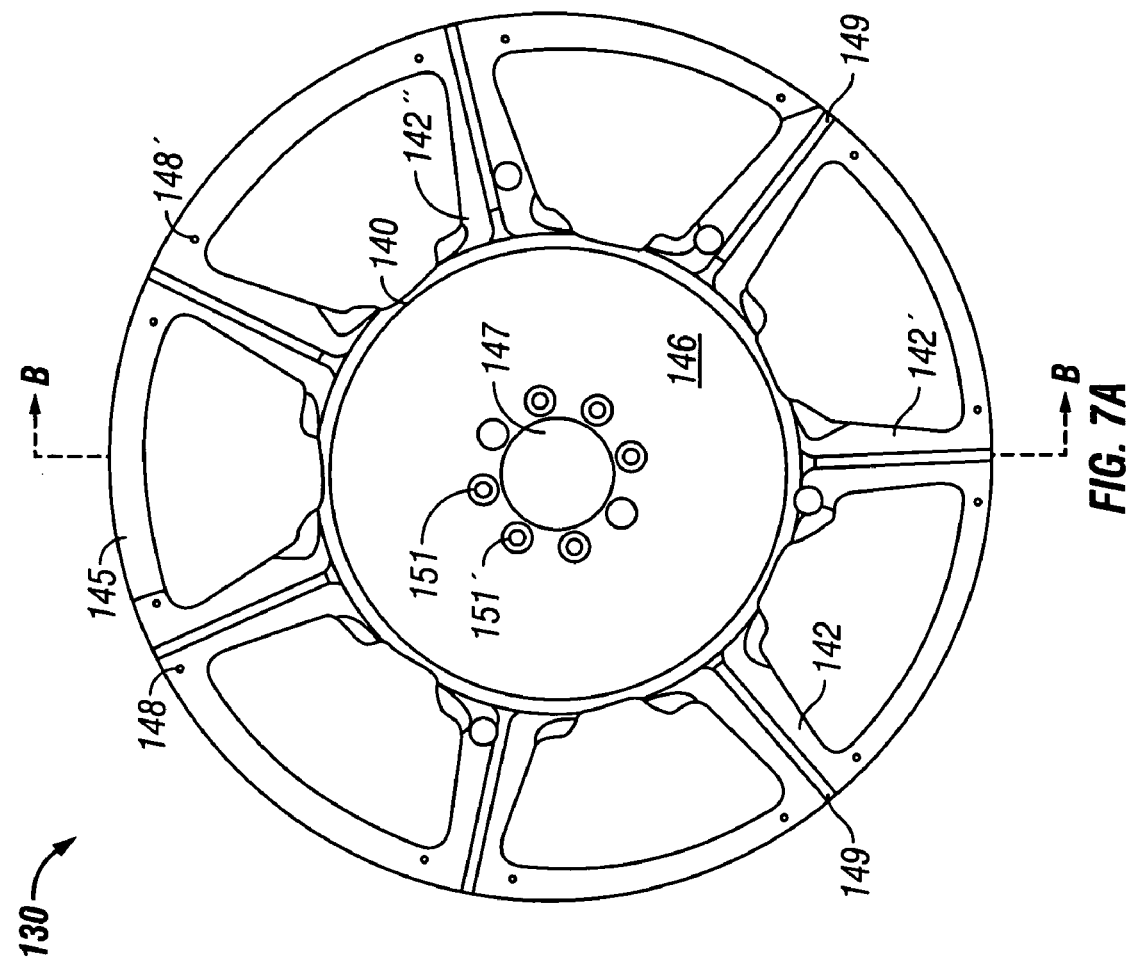
FIG. 7A is an outside end (axial) view of an inner right isolator plate according to the apparatus of the invention.
Figure 8B:
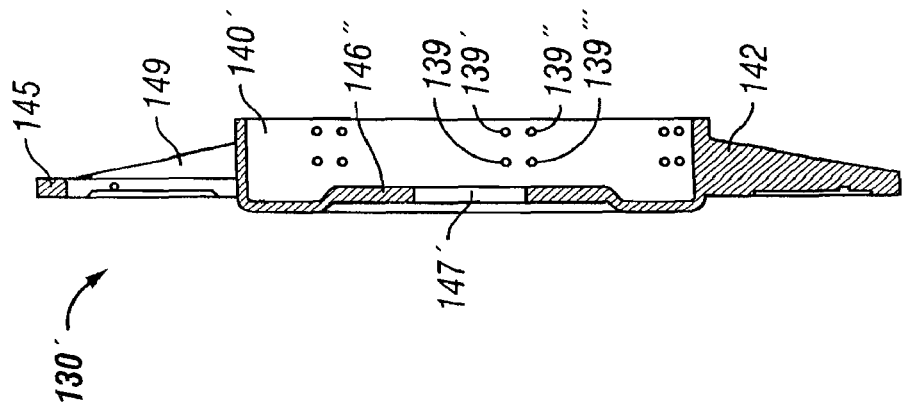
FIG. 8B is a side sectional view of the isolator plate shown in FIG. 8A, taken along section line B-B in FIG. 8A.
Figure 8A:
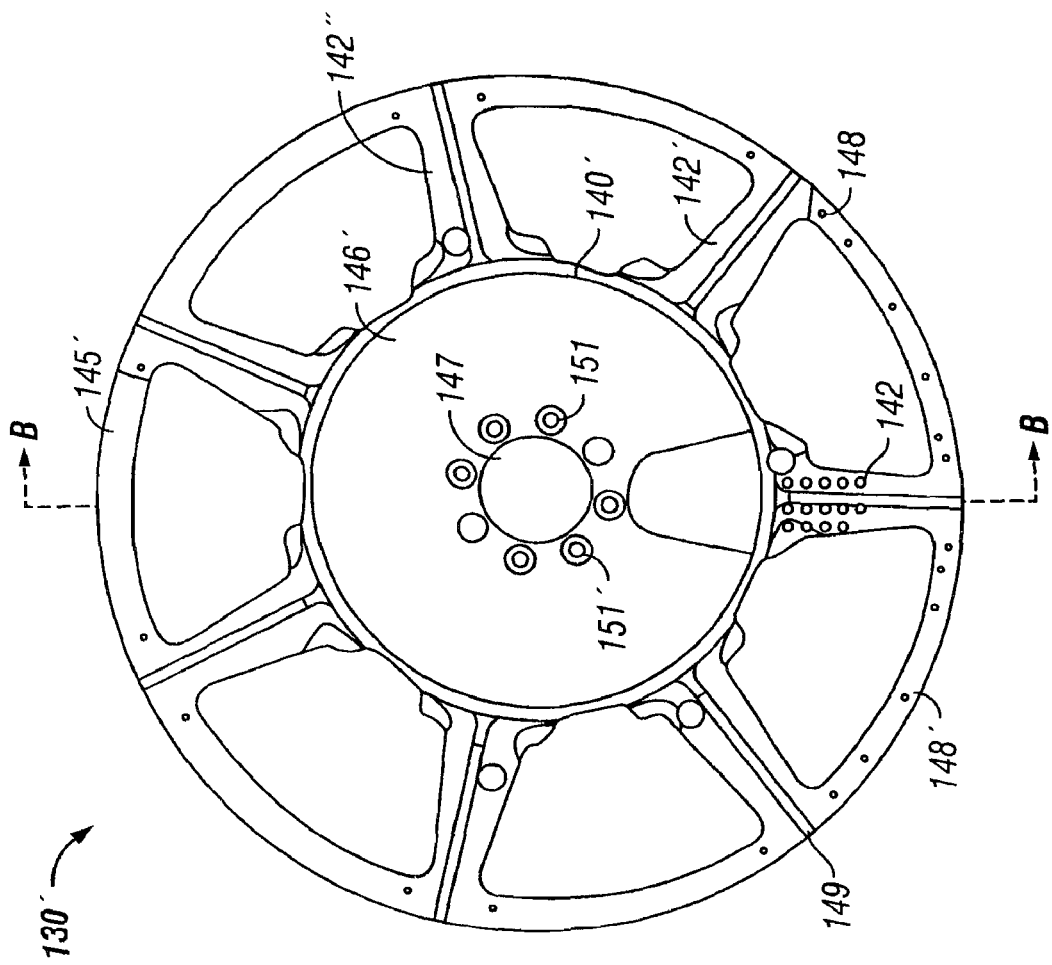
FIG. 8A is an outside end (axial) view of an inner left isolator plate according to the apparatus of the invention.
Figure 9A:
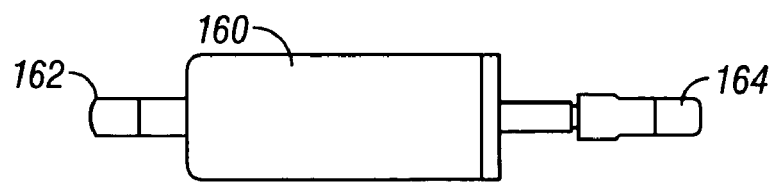
FIG. 9A is an enlarged side (longitudinal) view of a hydraulic damper component of the invention.
Figure 9B:
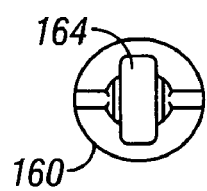
FIG. 9B is an end (axial) view of the hydraulic damper shown in FIG. 9A.
Figure 9C:
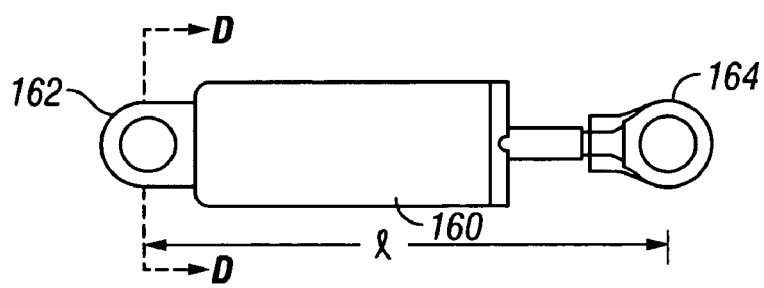
FIG. 9C is the hydraulic damper component shown in FIG. 9A, rotated axially by 90 degrees to depict added features of the component.
Figure 9D:
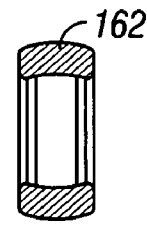
FIG. 9D is a radial sectional view of the damper seen in FIG. 9C, taken along section line D-D in FIG. 9C.

FIGS. 7A and 7B illustrate the right inner isolator plate 130, while FIGS. 8A and 8B depict the left inner isolator plate 130'. As these figures show, the two inner isolator plates 130, 130' are substantially identical. The inner isolator plates 130, 130' preferably are machined from aluminum alloy 6061-T651 or suitable alternatives. With outer isolator plates 120, 120' having diameters of approximately 9.0 inches, for example, the inner isolator plates 130, 130' may have slightly larger overall diameters, for example approximately 11.5 inches as defined by rim 145. As indicated in the figures, the inner isolator plates 130, 130' are configured much like a wheel with spokes. A cylindrical wall defines the hub 140, 140' from which extend radially the plurality of integral spokes 142, 142', 142", preferably six in number. In the preferred embodiment being specifically described, the hub 140 has an inside diameter of, for example, approximately 6.0 inches, and a depth of about 1.2 inches. A plurality, preferably seven, of groups of connection apertures 139, 139', 139", 139'" are equally spaced around, and defined through, the wall of the hub 140 or 140' for connection of the hydraulic dampers 142 to the inner isolator plates as further described herein.

Each of the spokes 142, 142', 142" has a reinforcing flange 149 running centrally and longitudinally. The spokes 142, 142', 142" support the circular rim 145, 145' in concentric spaced relation from the hub 140 or 140'. The hub 140 or 140' of each of the inner isolator plates 130, 130' has a floor 146, 146', which in turn defines a central aperture 147, 147'. The apertures 147, 147' have diameters of, for example, about 1.5 inches. The rim 145 or 145' is provided with various connector attachment holes 148, 148', arranged as seen in FIGS. 7A and 8A. A plurality, such as eight, hub attachment holes 151, 151' penetrate the floor 146, 146' of each plate 130, 130' in a radial array around the respective central aperture 147 or 147', as best indicated in FIGS. 7A and 8A. The attachment holes 151, 151' may be used to fasten the object to be isolated to the inner isolation plate 130 or 130'.

It is seen that the offset character of the hub tables 127, 127', in relation to the axes of the hubs 122, 122', of the outer isolator plates 120, 120' supplies a means for providing balanced concentricity of the various components of each assembly 100, 100' despite the effects of gravity. The loading of a payload to be protected, e.g. an approximately 85-lb instruments package, causes the inner isolation plates 130, 130' to shift downward, against the bias of the extension springs, relative to the outer isolation plates 120, 130. Using known methods of calculation, this shifting distance, or "sag," can be predetermined, and the degree of offset embodied in the outer isolation plates 120, 120' fashioned to correspond to the shifting distance. (The measure of the offset is calculated based upon, among other things, primarily the weight of the payload.) An aspect of the invention, thus, is the customized construction of outer isolation plates 120, 120' having ring ridges 133,133' and corresponding features that are offset from the isolator plates' central axis a distance approximately equal to the anticipated shifting distance resulting from the weight of the identified payload.

The outer isolation plates 120, 120' are mounted vertically (on their respective yoke bases) with their respective ring ridges 133, 133' offset downward, i.e., with the broadest portion of the table 127, 127' registered at the 6:00 o'clock position. With these eccentricities of the outer isolation plates 120, 120' thus aligned in the direction of the vertical gravity vector, when the inner isolation plates 130, 130' are loaded with the payload, the central axis of the inner isolation plates 130, 130' moves downward. This downward movement is over a distance equal to the predetermined shifting distance, and thus brings the central axes of all isolator plates 120, 120', 130, 130' into alignment. The principal components of the assemblies 100, 100' consequently are placed into coaxial registration, so that the isolator assemblies thereafter operate and function symmetrically.

The inner isolator plates 130, 130' are attached to the respective outer isolator plates 120, 120' by, among other things, a plurality of extension springs 132, 132', as seen in, for example, FIGS. 1A, 1B, 2A and 2B, 12A-D, and 13A-13D. In the preferred embodiment, the extension springs 132, 132' number fourteen, although the apparatus can be customized in size and therefore require more or less than this number of extension springs. The extension springs 132, 132' are, however, always arranged in pairs as indicated in the drawing figures. Each spring 132 preferably is manufactured from material 17-7PH CRES, to have a spring rate, in one preferred embodiment, of approximately 35±3 lb/inch, and a diameter of about one-half inch with a free length of approximately 1.66 inches. The extended length preferably is about 2.41 inches, at an initial tension, when installed, of approximately 7.8 lbs and a load at the extended length of about 31.6 lbs. The terminal hooks of one spring from each installed pair preferably are radially offset from each other by approximately 90°, while the other spring of the pair preferably has terminal hooks in mutual alignment. Suitable springs are available from Associated Spring Raymond, Maumee, Ohio, USA, as part numbers E19-060302-20-BDC and E19-060602-01-BDC.

FIGS. 9A-D depict the preferred hydraulic damper component for use in the inventive apparatus. In the preferred embodiment, the dampers 142, 142' number fourteen, although the apparatus can be customized in size and therefore require more or less than this number of dampers. The hydraulic dampers 142, 142' are, however, always arranged in pairs as indicated in the drawing figures. Referring to FIGS. 9A-D, each damper 142 is of generally conventional construction, having a closed hydraulic cylinder 160 from which the movable (damped) rod 161 extends under the damping influence of the piston within the cylinder 160 (FIGS. 12D and 13D). A base ring 162 is secured to the end of the cylinder 160, while the operative eyelet 164 is secured to, or integral with, the movable rod 161.

Each hydraulic damper 142 preferably meets performance standards according to the given application. In the preferred embodiment, the damper 142 shall meet all performance standards over the temperature range of −40° C. to 70° C. The plurality of dampers incorporated into the inventive apparatus shall have consistent, substantially performance specifications. Thus, in a complete pair of assemblies 100, 100' the various dampers shall be, for example matched sets of 28 units, with no individual damper in the set deviating more than 10% from the average damping coefficient of the set. In one preferred embodiment, each damper 142 preferably has a minimum damping coefficient of 0.6 lb-sec/inch when subjected to cyclic displacements of ±0.006 through ±0.050 inches with frequencies of 5 to 10 Hz. Over this range of displacements and frequencies, the damping preferably is approximately viscous in character. The energy loss per cycle is consistent with that expected according to known viscous damping laws.

The force generated by a damper 142 is such that it does not exceed that expected by viscous damping laws for cyclic displacements less than ±0.005 inch and frequencies from about 20 to about 100 Hz for the damping coefficient determined according to the specifications above. The center position (center of base ring 162 to center of eyelet 164, 1 in FIG. 9C) is about 2 inches, and the damper 142 preferably allows a stroke of ±0.34 inch from the center position. Preferably, the damper meets the performance requirements disclosed above for any piston position within approximately ±0.275 inch of the center position. Also, the damper 142 preferably exhibits no more than approximately 0.5 lb stiction prior to initial piston breakaway. The damper 142 ideally possesses less than 10 lb/inch residual stiffness for any of the foregoing conditions, as determined by the phase shift of the damper force relative to the input displacement. Further, in the preferred embodiment, the damper 142 shall not be damaged when subjected to a maximum transient shock velocity of 30 inches/sec applied for a minimum duration of 0.005 seconds. The performance of each damper 142 preferably is not appreciably affected by its orientation relative to the gravity vector. Respecting component longevity, it is preferred that the damper 142 maintains at least 50% of the damping capacity defined above, after exposure to the following vibrations: ±0.035 inches at 7.5 Hz for 8,500 hours; ±0.080 inches at 7.5 Hz for 1,400 hours; and ±0.125 inches at 7.5 Hz for 100 hours. A suitable hydraulic damper 142 is available from Enidine, Inc., Orchard Park, N.Y., USA, as part number SP21847.

Figure 10A:
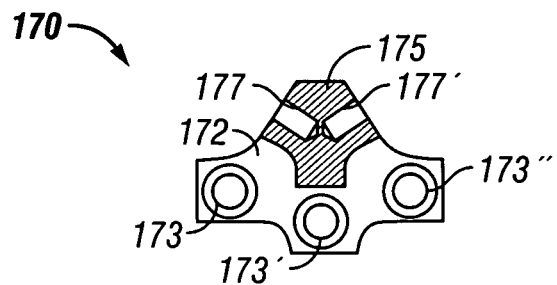
FIG. 10A is an enlarged partial sectional top view of an outer damper mount component of a preferred embodiment of the present invention, taken along section line A—A in FIG. 10D.
Figure 10B:
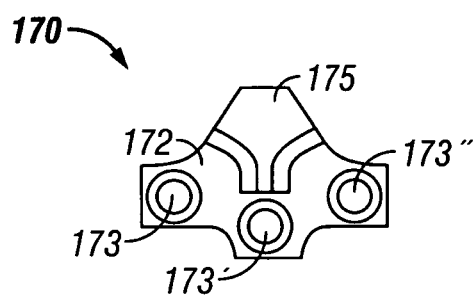
FIG. 10B is a top view of the damper mount component shown in FIG. 10A.
Figure 10C:
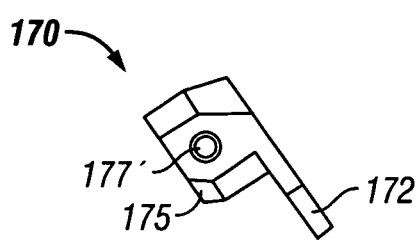
FIG. 10C is a rotated right side view of the damper mount component shown in FIG. 10B.
Figure 10D:
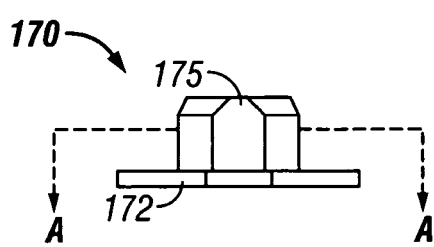
FIG. 10D is a front view of the damper mount component shown in 10B.
Figure 10E:
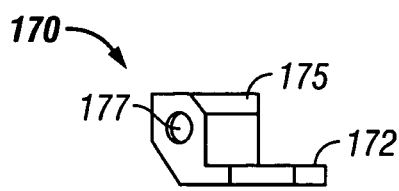
FIG. 10E is a left side view of the damper mount component shown in FIG. 10D.

The apparatus of the invention includes customized mounts for mounting the plurality of hydraulic dampers 142, 142' to the inner and outer isolator plates 120, 120', 130, 130' of the respective isolator assemblies 100, 100'. Collective reference is made to FIGS. 10A-E, which depict one outer damper mount 170 that preferably is used to pivotally secure a hydraulic damper 142 to the outer isolator plate 120. The outer mount 170 features a base flange 172 penetrated by at least one, and preferably three, fastener apertures 173, 173', 173". Fastener apertures 173, 173', 173" permit a bolt or screw or other fastener to be used to securely connect the mount 170 to the outer isolator plate 120. In the preferred embodiment, the outer damper mount 170 is secured to the outer isolator plate 120 or 120' by means of the passage of screws or bolts through the fastener apertures 173, 173', 173" for threaded engagement into a corresponding group of connection apertures 138, 138', 138''' in the inside face of the outer isolator plate 120 or 120', as seen in FIGS. 4, 5A and 6A. Each outer mount 170 also features a projecting bezel 175 into which a pair of fastener holes 177, 177' are tapped. As best seen in FIG. 10A, the outer mount fastener holes are provided in a mutually angled orientation. The fastener holes 177, 177' permit a screw or bolt or pin, for example, to be passed through the base ring 162 of the damper 142 and inserted, as by threaded engagement, into a respective one of the holes 177 or 177' to connect the damper 142 to the outer isolator plate 120, as seen in FIGS. 12D and 13D.

Figure 11A:
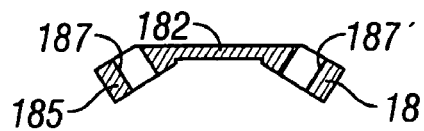
FIG. 11A is an enlarged partial sectional top view of an inner damper mount component of a preferred embodiment of the present invention, taken along section line A—A in FIG. 11B.
Figure 11B:
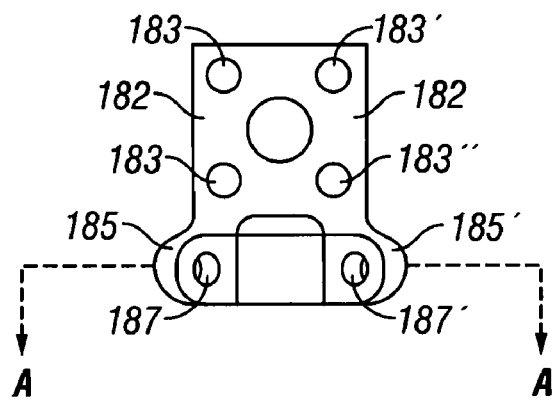
FIG. 11B is a front view of the inner damper mount component shown in FIG. 11A.
Figure 11C:
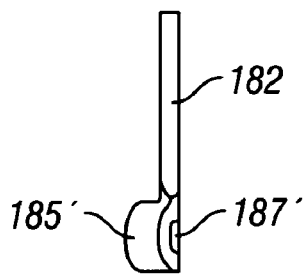
FIG. 11C is a right side view of the inner damper mount component shown in FIG. 11B.
Figure 11D:
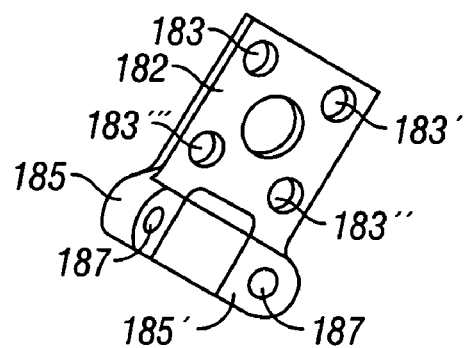
FIG. 11D is a perspective, rotated view of the inner damper mount component shown in FIG. 11B.

Combined reference is made to drawing FIGS. 11A-11D, depicting a preferred inner damper mount 180 by which the inner end of a hydraulic damper 142 is connected to the inner isolator plate 130 or 130'. The inner mount 180 features a base flange 182 penetrated by at least one and preferably four fastener apertures 183, 183', 183", 180'''. Fastener apertures 183, 183', 183", 183''' permit a bolt or screw or other fastener to be used to securely connect the mount 180 to the inner isolator plate 130. In the preferred embodiment, the inner damper mount 180 is secured to the inner isolator plate 130 or 130' by means of the passage of screws or bolts (not shown) through the fastener apertures 183, 183', 183", 183'" for threaded engagement into a corresponding group of connection apertures 139, 139', 139", 139'" in the hub 140 of the inner isolator plate 130 or 130', as seen in FIGS. 7B and 8B, and further suggested in FIGS. 12B and 13B. Each inner mount 180 also features a pair of projecting angled flanges 185, 185' into which a fastener hole 187, 187' is defined. As best seen in FIG. 11A, the outer mount flanges 185, 185' are provided in a mutually angled orientation. The fastener holes 187, 187' permit a screw or bolt or pin, for example, to be passed through the base ring 164 of the damper 142 and inserted through a respective one of the holes 187 or 187'. Since the mount 180 is fixed to the inner isolator plate 130 or 130', such a pinned connection of the damper 142 to the mount 180 serves to pivotally connect the damper to the inner isolator plate 130 (FIGS. 12D and 13D).

Figure 1A:
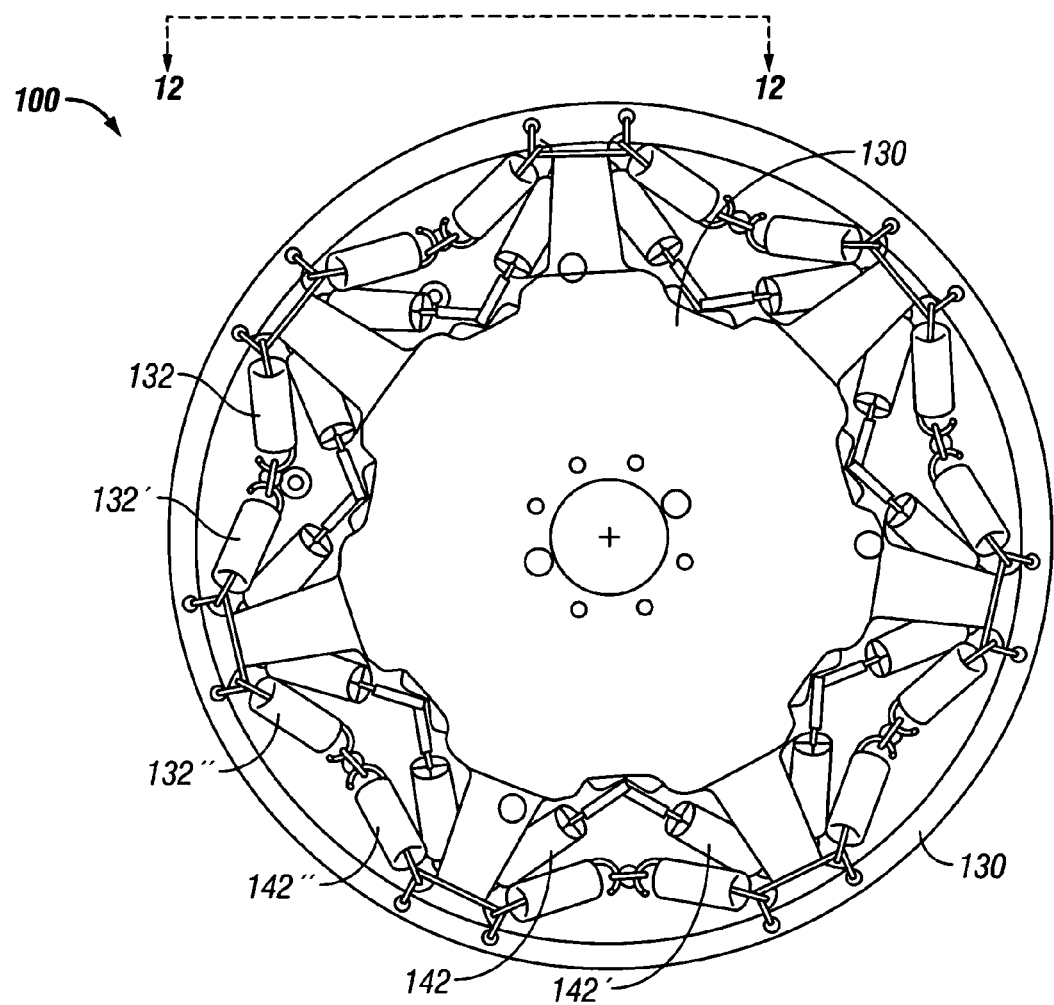
FIG. 1A is an inside end (axial) view of a right isolator assembly according to a preferred embodiment of the present invention.
Figure 1B:
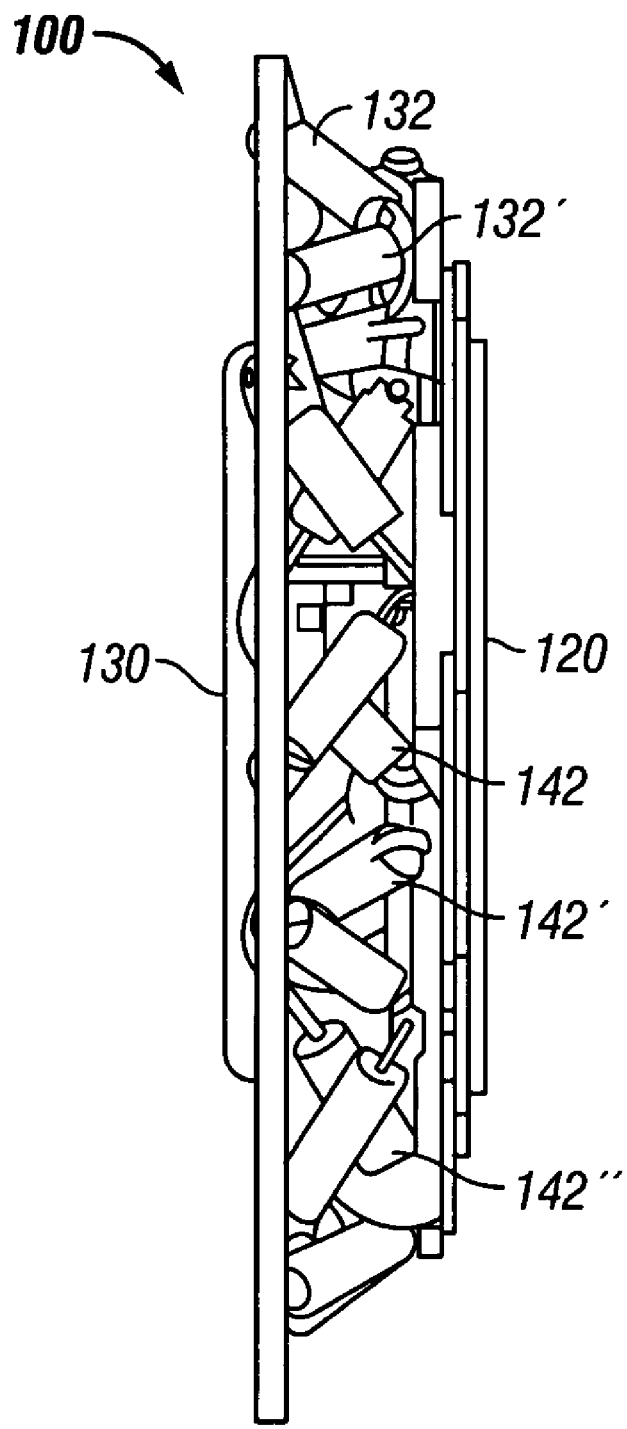
FIG. 1B is a side view of the right side isolator assembly shown in FIG. 1A.
Figure 2A:
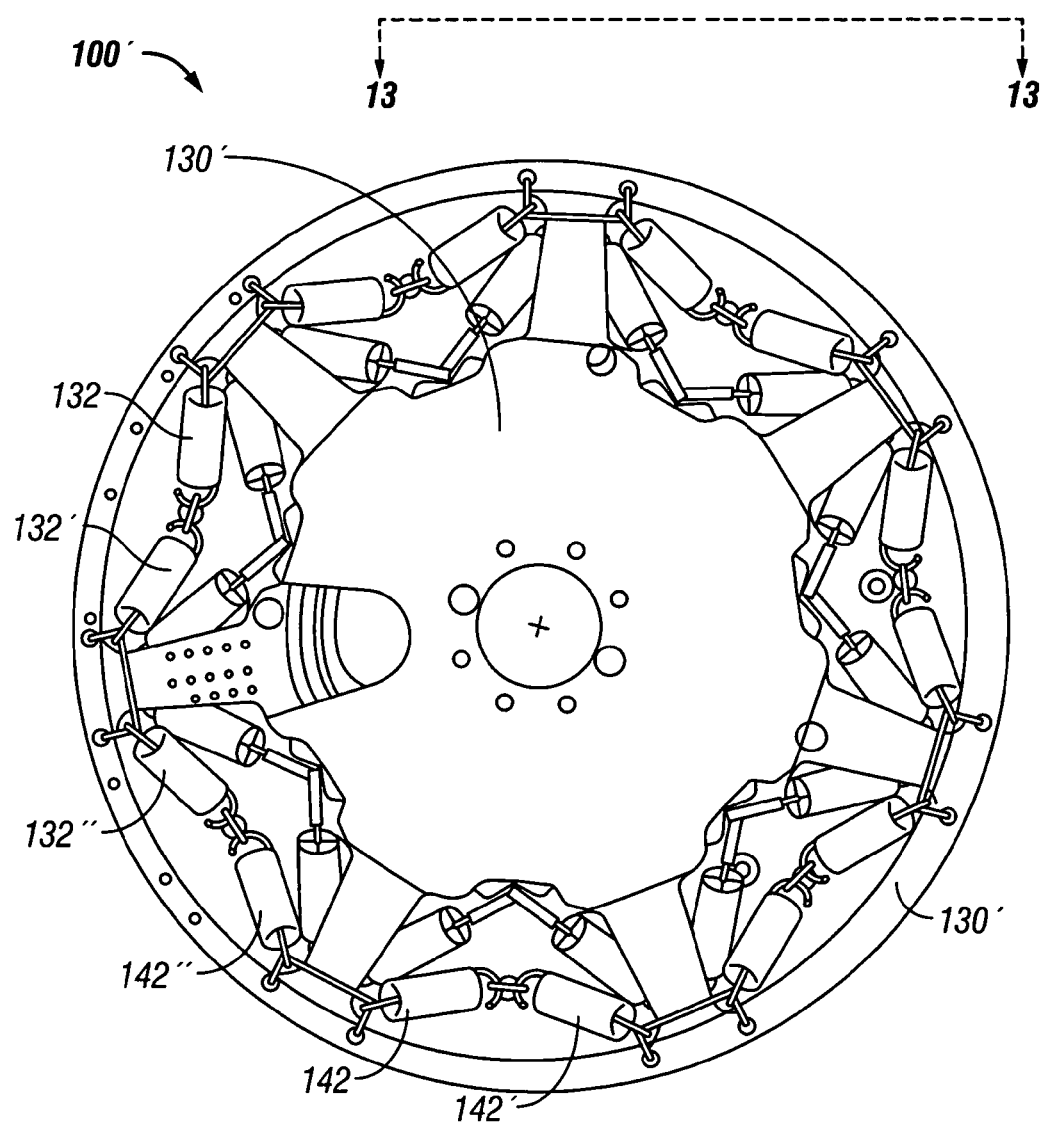
FIG. 2A is an inside end (axial) view of a left isolator assembly according to a preferred embodiment of the present invention, typically used in combination with the right isolator assembly shown in FIGS. 1A and 1B.
Figure 2B:
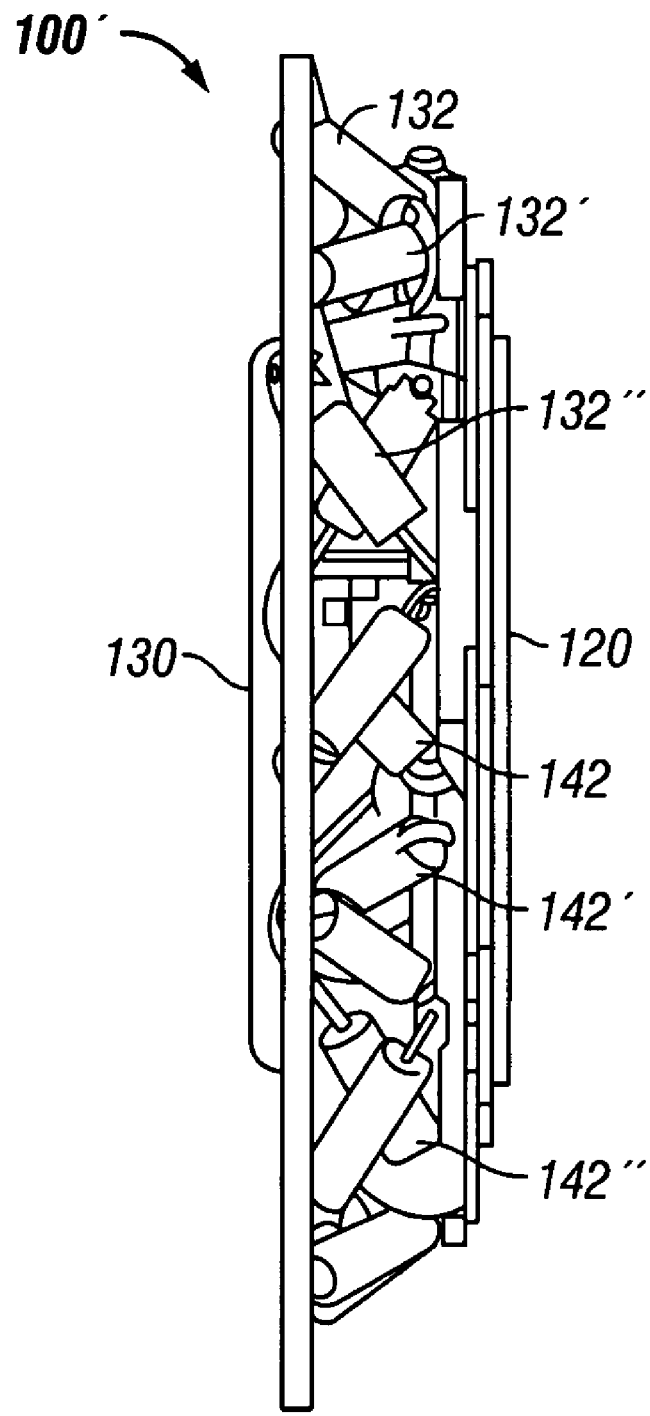
FIG. 2B is a side view of the right side isolator assembly shown in FIG. 2A.
Figure 12A:
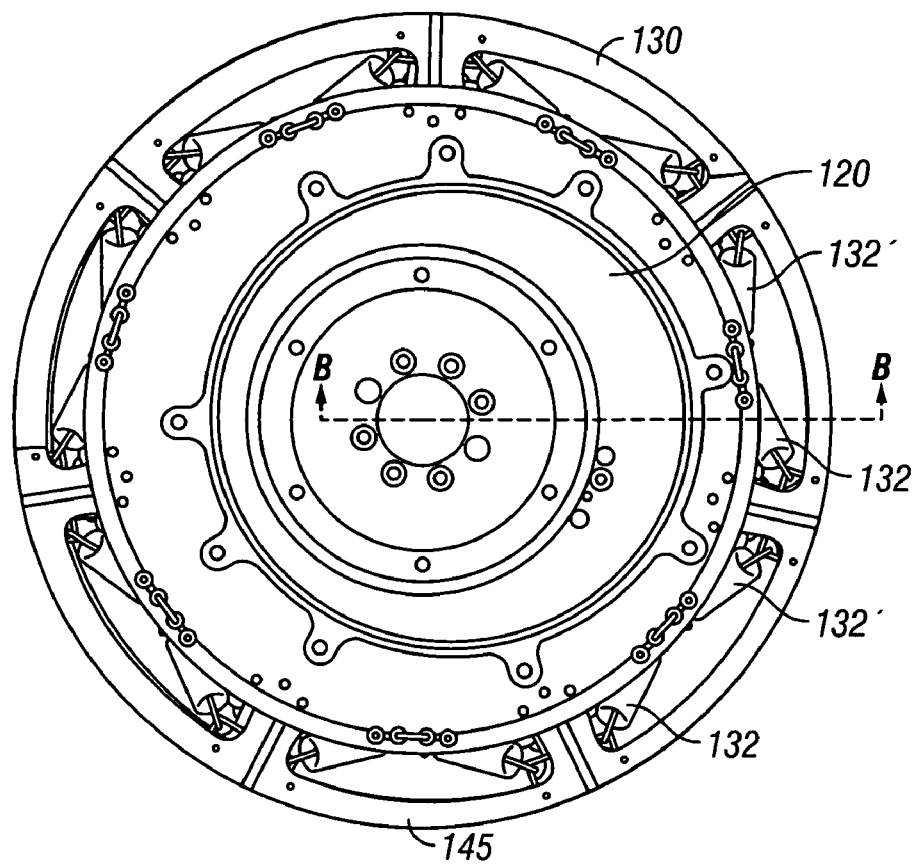
FIG. 12A is an outside end (axial) view of the assembled right isolator assembly shown in FIG. 1A, according to a preferred embodiment of the present invention.

FIG. 12A is an outside end view of the right isolator assembly 100 (depicted from an inside end view in FIG. 1A). FIG. 12A shows, among other things, the various holes and apertures in the isolator plates 120, 130 used to attach the outer damper mounts 170 to the outer isolator plate, and with which the extension springs 132, 132' are connected to the inner isolator plate. Combined reference to FIGS. 4 and 5B, for example, illustrate how the in the preferred embodiment, the outer damper mount 170 is secured to the outer isolator plate 120 by inserting fasteners through the outer damper mount and into a corresponding group (e.g. three) of connection apertures 138, 138', 138'" in the outer isolator plate. Similarly, combined reference to FIGS. 3, 4, and 7B suggest how, the in the preferred embodiment, the inner damper mount 180 is secured to the inner isolator plate 130 by inserting fasteners through the inner damper mount and into a corresponding group (e.g. four) of connection apertures 139, 139', 139", 139'" in the hub 140 of the inner isolator plate 130. FIGS. 3 and 4 show the use of special brackets 190, connected to the rim 145 of the inner isolator plate 130 using the various connector attachment holes 148, 148' seen in FIG. 7A, to attach the extension springs 132, 132' to the inner isolator plate. Apertures 192 in the periphery of the outer isolator plate 120 (FIG. 5A), connect the other ends of the springs 132, 132' to the outer isolator plate.

Figure 12B:
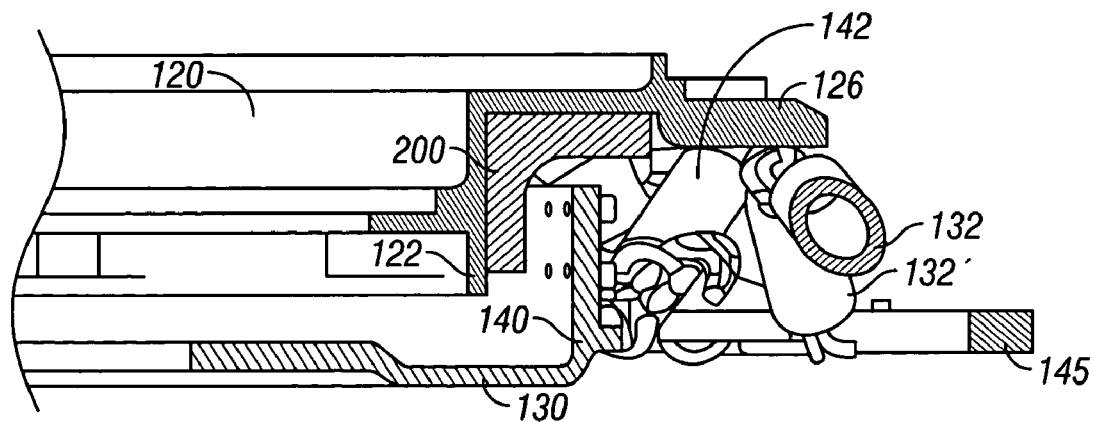
FIG. 12B is an enlarged, partial, sectional view of the apparatus shown in FIG. 12A, taken along section line B-B in FIG. 12A.
Figure 12C:
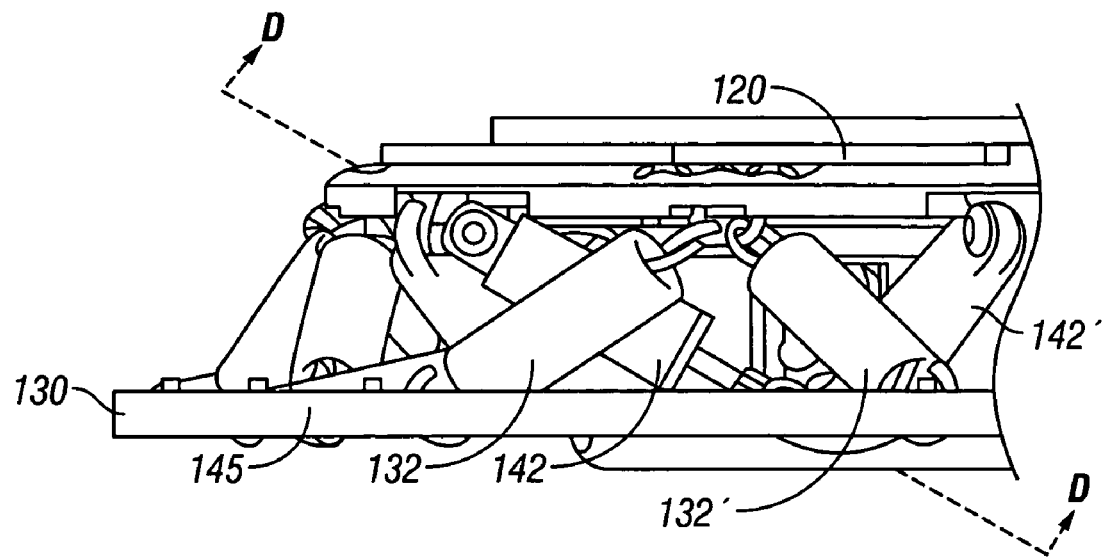
FIG. 12C is a partial side view, taken from vantage line 12-12 in FIG. 1A, of the apparatus shown in FIGS. 1A and 12A.
Figure 12D:
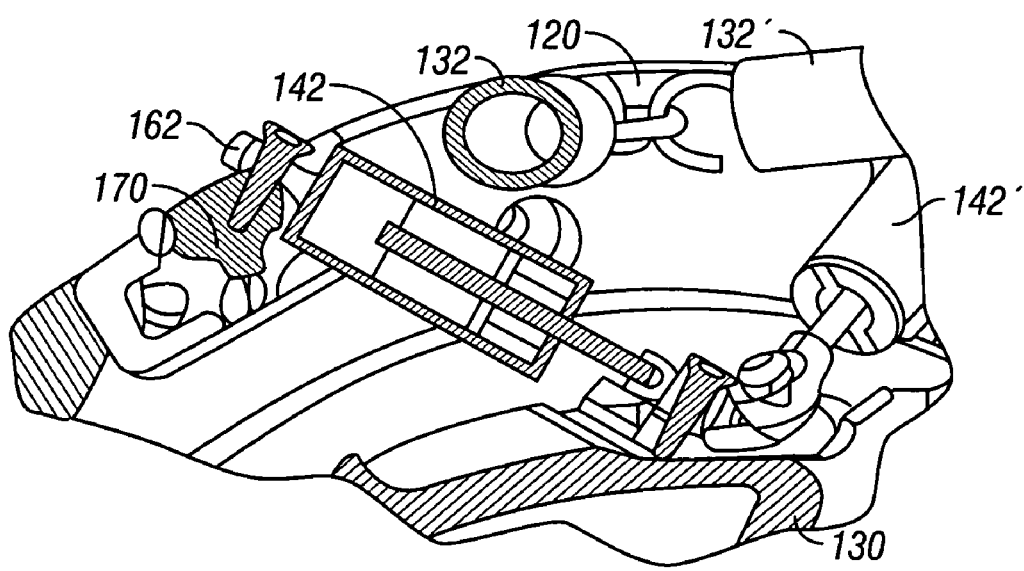
FIG. 12D is an enlarged sectional view of the portion of the apparatus shown in FIG. 12C, taken along section line D-D in FIG. 12 C.

FIGS. 12A-D provide added detail concerning the positional relationships and interconnections between the right inner isolator plate 130, the right outer isolator plate 120, and a hydraulic damper 142, when the right isolator assembly 100 is properly assembled for use. FIG. 12B is an enlarged partial side view of the assembly 100 seen in FIG. 12A. FIG. 12B is an enlarged sectional view of the apparatus depicted in FIG. 12A, taken along section line B-B in FIG. 12A. FIG. 12D is an enlarged sectional view of the apparatus depicted in FIG. 12C, taken along section line D-D in FIG. 12C. Particular attention is invited to FIG. 12B, which shows the situation of the right outer isolation plate 120 parallel adjacent to the right inner isolation plate 130, with the hub 122 of the outer plate 120 inserted concentrically within the basin defined by the hub 140 of the inner plate 130. Combined action of the extension springs 132 and hydraulic dampers 142 serve to maintain the isolator plates 120, 130 in close adjacency as seen in FIGS. 12B and 12C.

A rubber snubber 200 protects against damaging collision between the isolator plates 120, 130 in the event the system is "overdriven" by unexpectedly high accelerations. Nevertheless, the extension springs 132 and hydraulic dampers 142 normally serve to insulate or isolate the inner isolator plate 130 from movements of the outer isolator plate 120. The snubber 200 is located at the isolator plates' "end of travel," so that in the vent of a catastrophic incident, such as hard landings (as can be anticipated to have, for example, three hours or less duration over the expected 10,000 hour life expectancy of the apparatus), or in a particularly extreme combination of concurrent acceleration events, the isolator plates engage the snubber 200 to provide redundant or added shock absorbency for payload protection.

Figure 13A:
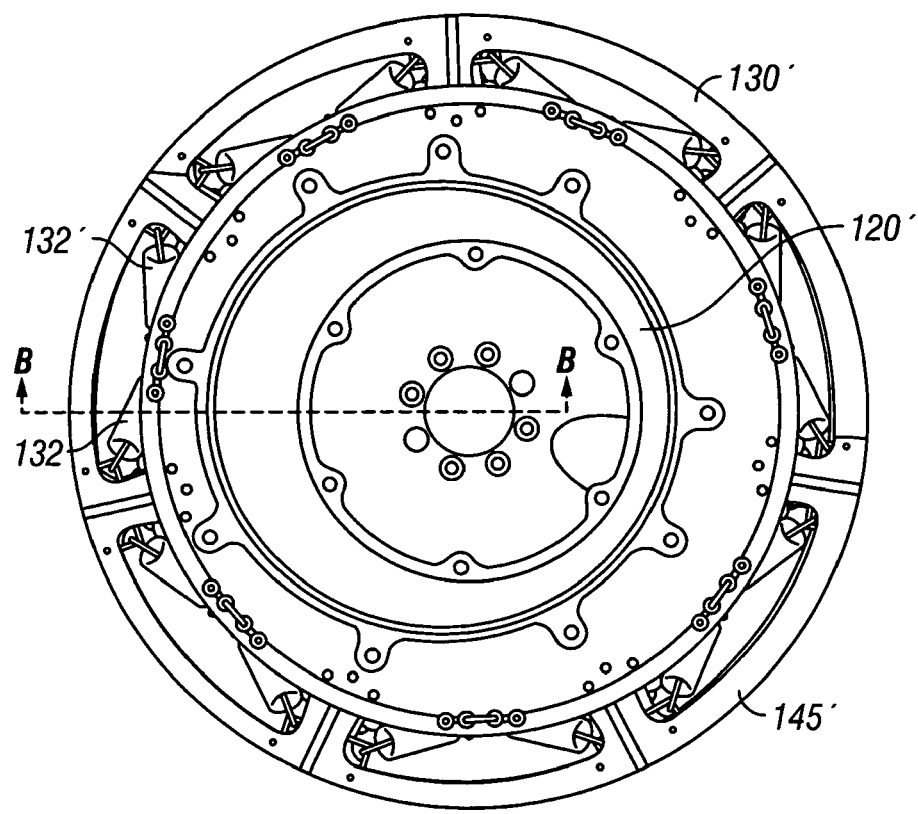
FIG. 13A is an outside end (axial) view of the assembled left isolator assembly shown in FIG. 2A, according to a preferred embodiment of the present invention.
Figure 13B:
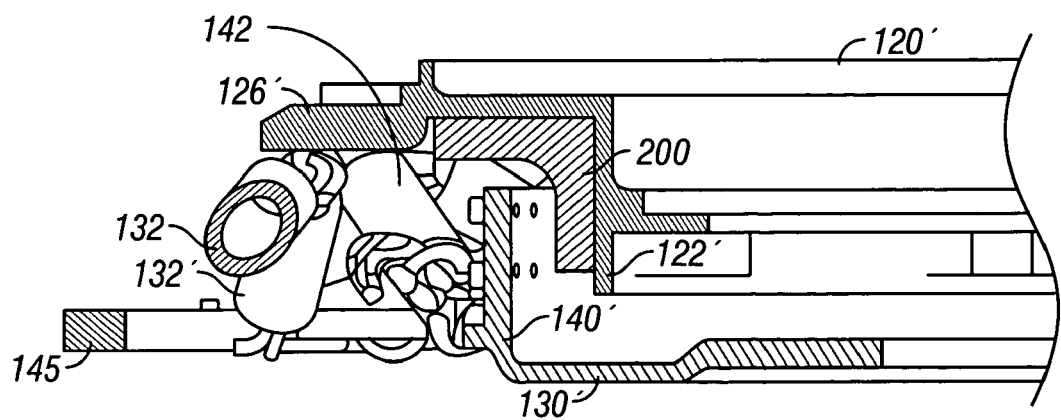
FIG. 13B is an enlarged, partial, sectional view of the apparatus shown in FIG. 13A, taken along section line B-B in FIG. 13A.
Figure 13C:
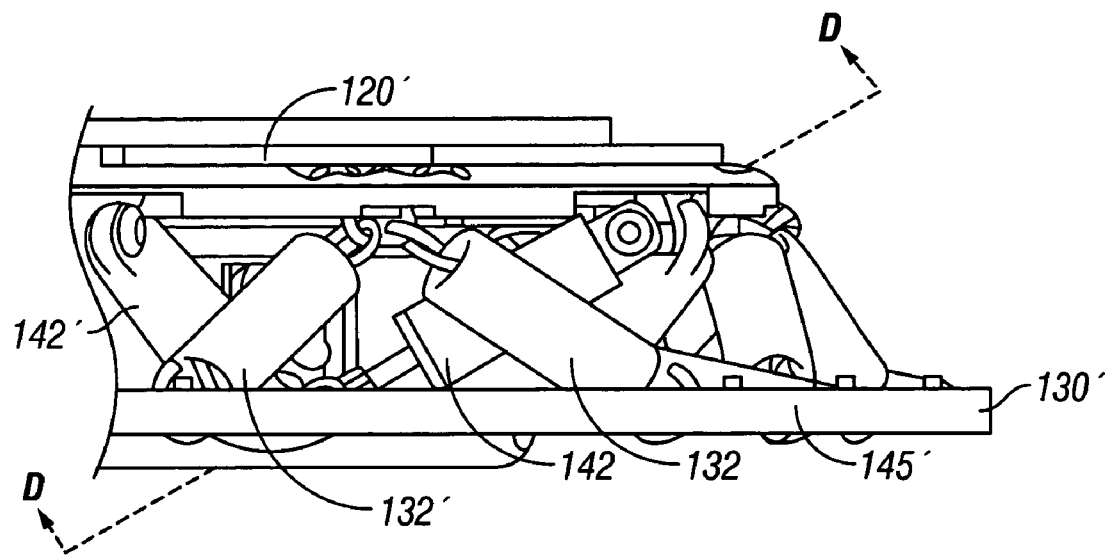
FIG. 13C is a partial side view, taken from vantage line 13-13 in FIG. 2A, of the apparatus shown in FIGS. 2A and 13A.
Figure 13D:
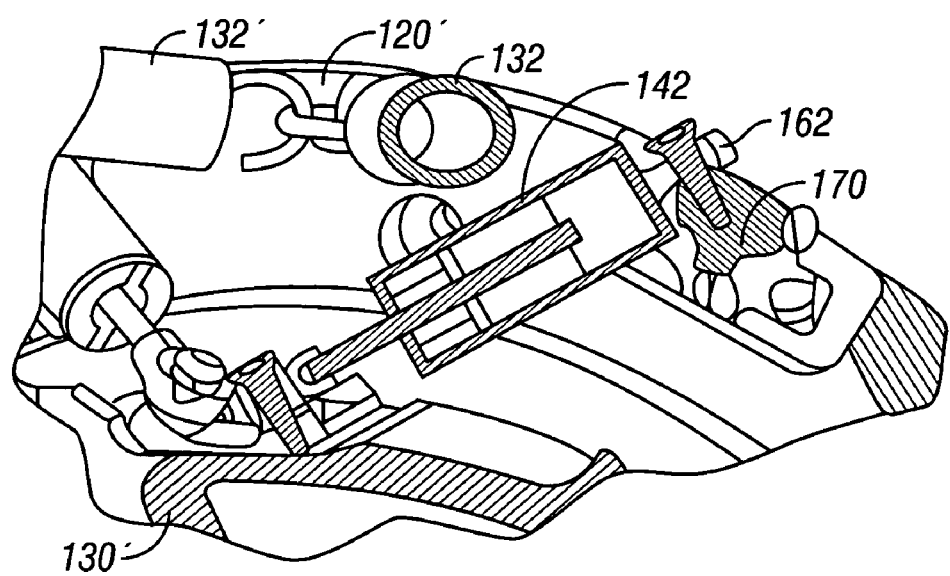
FIG. 13D is an enlarged sectional view of the portion of the apparatus shown in FIG. 13C, taken along section line D-D in FIG. 13C.

FIGS. 13A-D are substantially similar to FIGS. 12A-D, but serve to show the relationships among the various components of the left assembly 100' of a pair of assemblies 100, 100'. A left isolator assembly 100' has a left inner isolator plate 130', a left outer isolator plate 120', and a hydraulic damper 142. FIG. 13B is an enlarged partial side view of the assembly 100' seen in FIG. 13A. FIG. 13B is an enlarged sectional view of the apparatus depicted in FIG. 13A, taken along section line B-B in FIG. 13A. FIG. 13D is an enlarged sectional view of the apparatus depicted in FIG. 13C, taken along section line D-D in FIG. 13C. FIG. 12B shows the situation of the left outer isolation plate 120' parallel adjacent to the left inner isolation plate 130', with the hub 122' of the outer plate 120' inserted concentrically within the basin defined by the hub 140' of the inner plate 130'. Combined action of the extension springs 132 and hydraulic dampers 142 serve to maintain the left isolator plates 120', 130' in close adjacency as seen in FIGS. 13B and 13C. Nevertheless, the extension springs 132 and hydraulic dampers 142 likewise serve to insulate or isolate the inner isolator plate 130' from movements of the outer isolator plate 120'.

It is seen, therefore, that the assembled system according to the present invention overcomes the disadvantages isolation systems employing undamped spring bias. When properly assembled and loaded, the inner 130, 130' and outer 120, 120' isolator plates are coaxially aligned. The assembles thereafter function in a symmetric fashion, with the inner isolator plates 130, 130' suspended in spaced relation from the outer isolator plates 120, 120'. Abrupt movement (translational or rotational) of the outer isolator plates 120, 120' is not immediately imparted to the inner isolator plates 130, 130', thus protecting the payload from rapid acceleration. Deleterious rebound effects due to the action of the extension springs 132 is ameliorated by the dampers 142. The circumferential array of springs and dampers, arranged in confronting pairs as described, insulate the inner isolator plates, and thus the payload, from acceleration in practically any direction, with "sway" contained in a relatively confined space.

INDUSTRIAL APPLICABILITY

The invention is further illustrated by the following non-limiting examples.

Example 1

A three-axis offset damping system was constructed generally in accordance with the foregoing description. The hydraulic dampers contained 80-weight oil in one example, or 50-weight oil in another example. The payload weighed approximately 84.1 lbs. The system was subjected to a randomly selected one of a series of controlled vibratory environmental conditions, and the system response was measured. The drawing figures described below thus pertain to only one of a vast set of possible environmental vibratory conditions and are offered only by way of example to demonstrate the effectiveness of the invention.

FIG. 14 is a table setting forth the response of the system in the vertical, longitudinal, and lateral axes, by natural frequency and damping percent, at 6 db transmissibility and either 50 W or 80 W oil in the dampers. A "control" was run using only extension springs, without any dampers. Combined reference to FIGS. 14-17 shows marked improvement in system response with dampers installed using 80 W oil.

Figure 15:
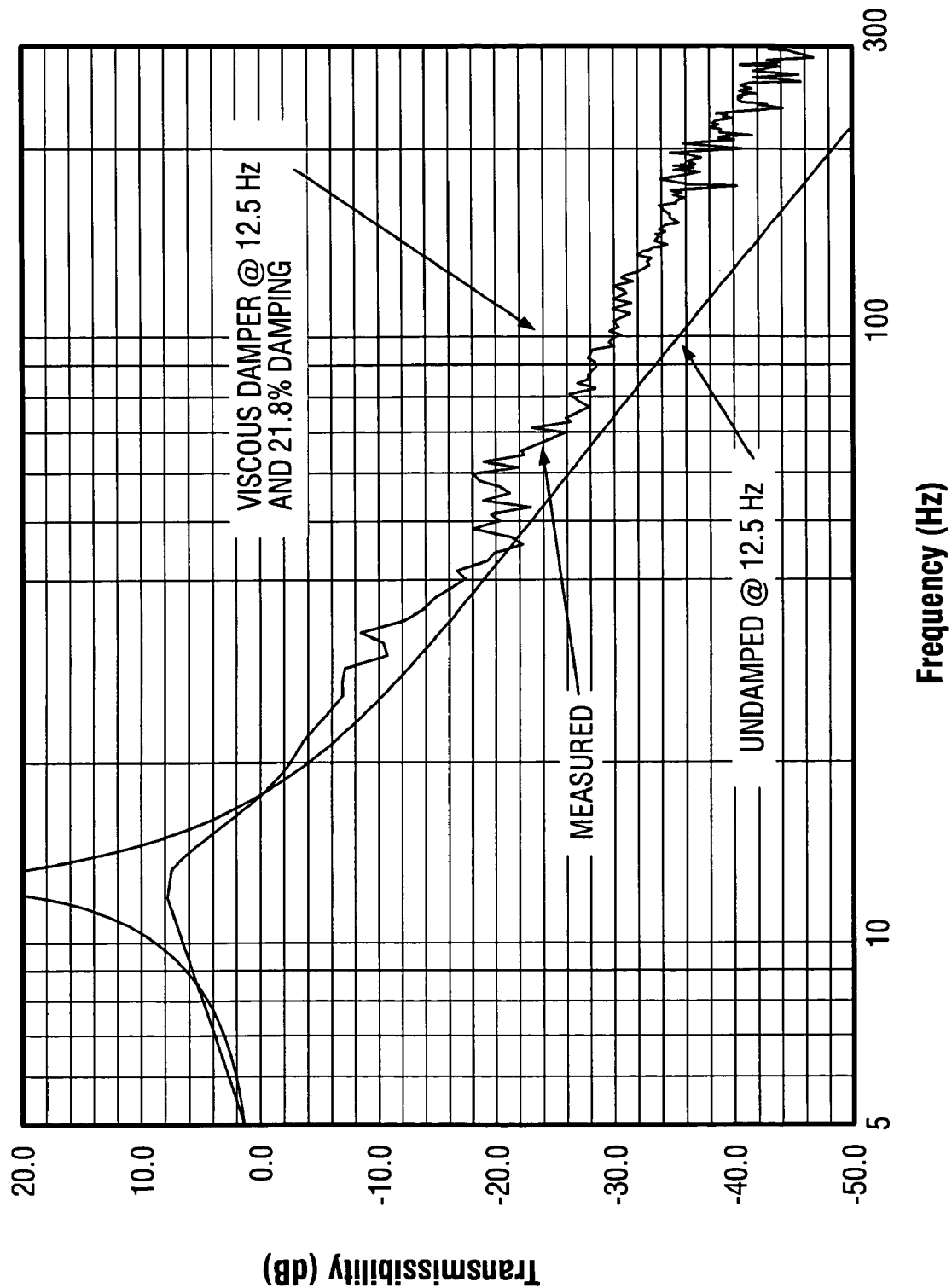
FIG. 15 is a graph illustrating the measured vertical axis isolation system transmissibility for a certain vibratory condition, with transmissibility (in db) displayed as a function of frequency (Hz)

FIG. 15 is a graph illustrating the measured vertical axis isolation system transmissibility. The system had an initial configuration with 38 lb/in extension springs and 80 W damper oil. With the system subjected to Group 1-21 vibration, transmissibility (in db) displayed as a function of frequency (Hz). Also charted are curves generated for an undamped system at 12.5 Hz, and with a viscous damper at 12.5 Hz and 21.8% damping.

Figure 16:
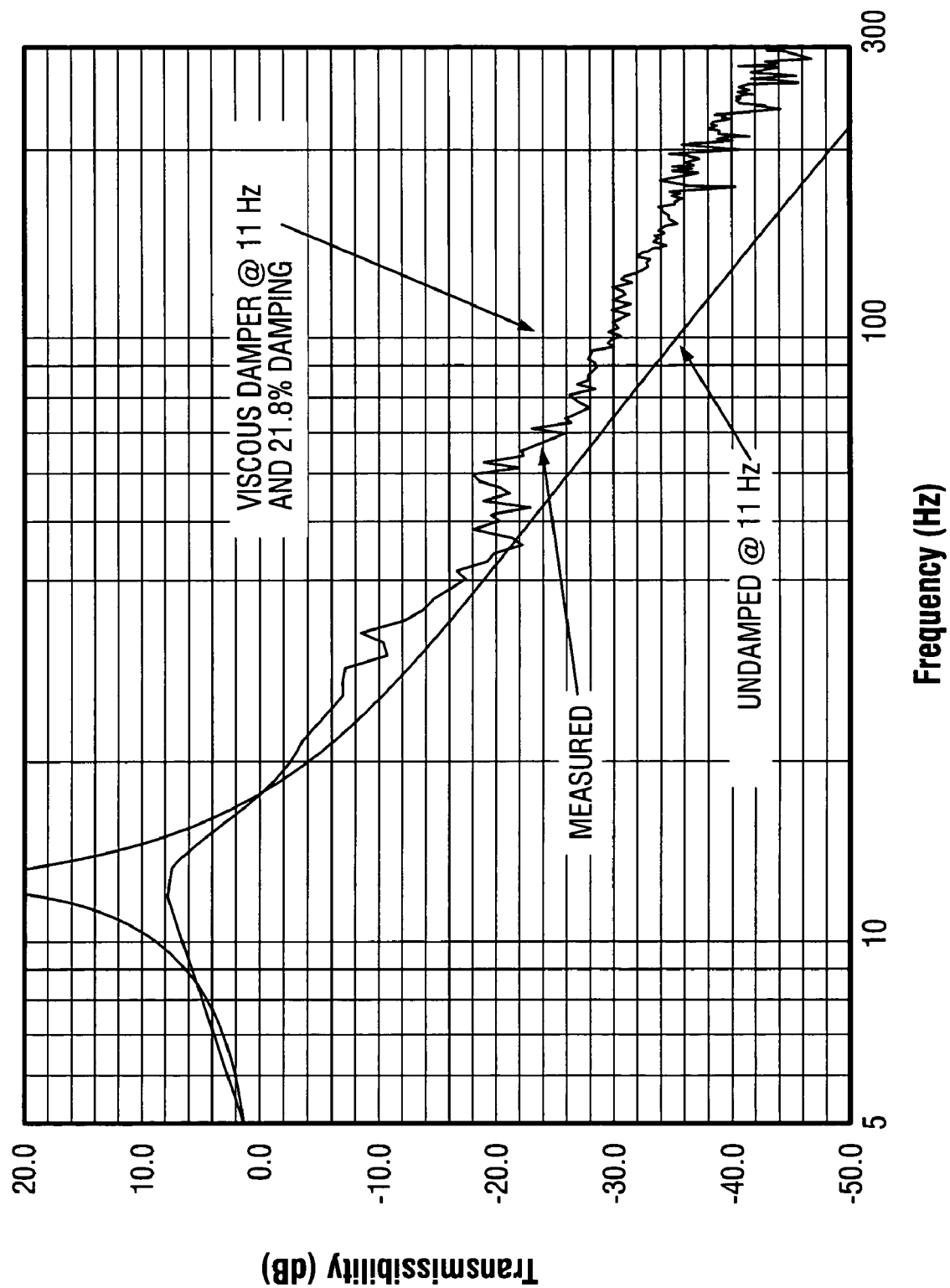
FIG. 16 is a graph similar to FIG. 15, except that it illustrates the measured lateral axis isolation system transmissibility.

FIG. 16 is a graph illustrating the measured lateral axis isolation system transmissibility. The system had an initial configuration with 38 lb/in extension springs and 80 W damper oil. With the system subjected to Group 1-21 vibration, transmissibility (in db) is displayed as a function of frequency (Hz). Also charted are curves generated for an undamped system at 11 Hz, and with a viscous damper at 11 Hz and 21.8% damping.

Figure 17:
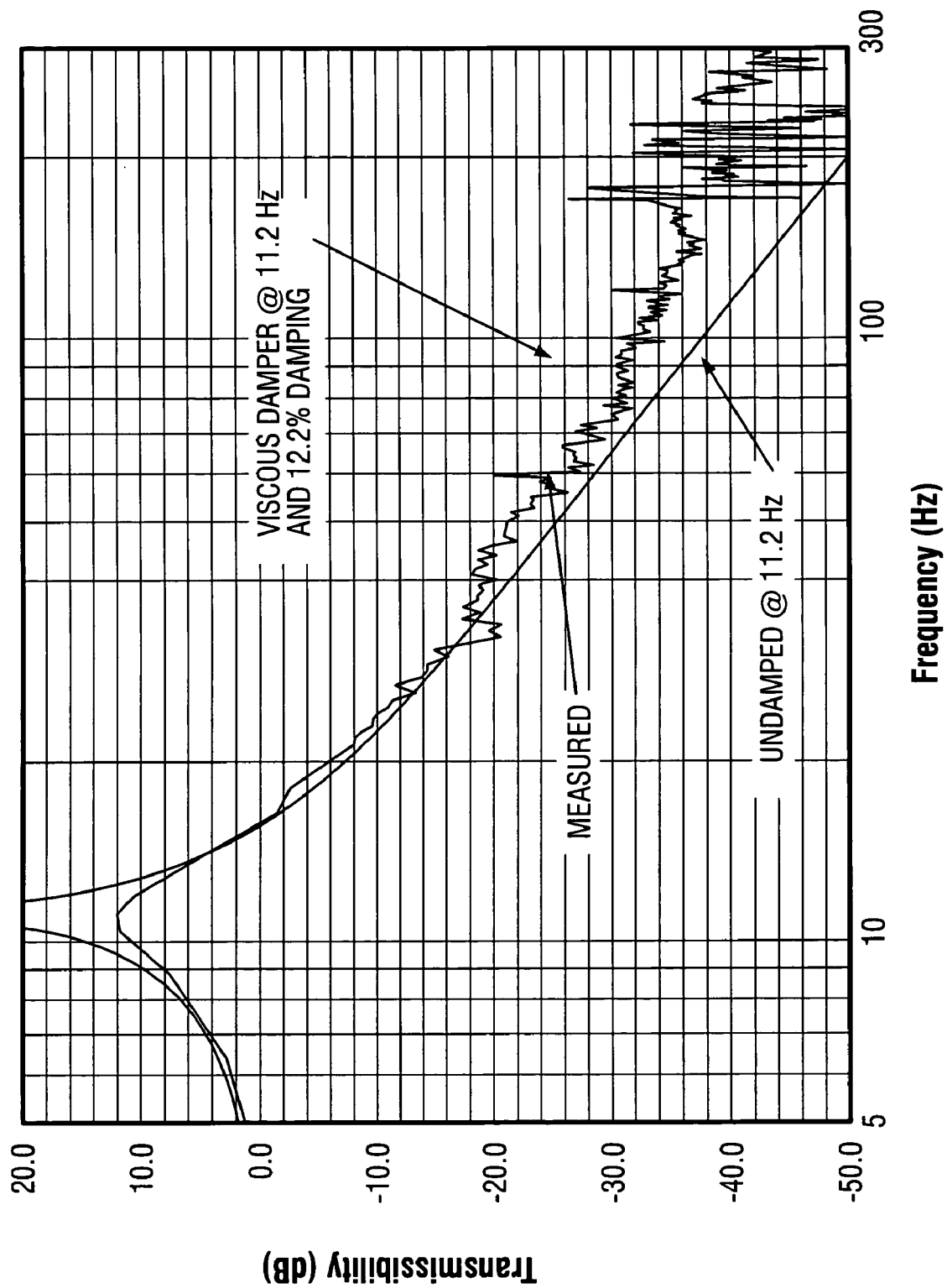
FIG. 17 is a graph similar to FIG. 15, except that it illustrates the measured longitudinal axis isolation system transmissibility

FIG. 17 is a graph illustrating the measured longitudinal axis isolation system transmissibility. The system had an initial configuration with 38 lb/in extension springs and 80 W damper oil. With the system subjected to Group 1-21 vibration, transmissibility (in db) is displayed as a function of frequency (Hz). Also charted are curves generated for an undamped system at 11.2 Hz, and with a viscous damper at 11.2 Hz and 21.8% damping.

The preceding example can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above are hereby incorporated by reference.

What is claimed is:

1. A damping isolator assembly comprising:
    an outer isolation plate comprising a hub and a plurality of ring ridges and corresponding features, said ridges offset from a central axis of said outer isolator plate by a distance approximately equal to an anticipated shifting distance resulting from the weight of a payload;
    an inner isolation plate comprising a hub;
    a plurality of dampers connecting said outer isolator plate to said inner isolator plate; and
    a plurality of springs connecting said outer isolator plate to said inner isolator plate, said dampers and said springs being connected to said outer isolator plate and said inner isolator plate at locations distinct from one another.

2. The apparatus of claim 1 wherein said outer isolator plate hub and said inner isolator plate hub are disposed in offset relation to each other to compensate for the force of gravity on said isolator assembly.

3. The apparatus of claim 1 wherein said dampers comprise hydraulic dampers.

4. The apparatus of claim 1 wherein a pair of said dampers are disposed adjacent to a pair of said springs.

5. The apparatus of claim 1 further comprising a plurality of outer mounts for mounting said plurality of dampers to said outer isolator plate and a plurality of inner mounts for mounting said plurality of dampers to said inner isolator plate.

6. The apparatus of claim 1 wherein said dampers are pivotally connected to said inner isolator plate.

7. The apparatus of claim 5 wherein said hub of said inner isolator plate is connectedly disposed between one of said plurality of said inner damper mounts and said inner isolator plate.

8. The apparatus of claim 1 further comprising a snubber to protect against collision between said outer isolator plate and said inner isolator plate.

9. A damping isolator assembly comprising:
    an outer isolation plate comprising a hub;
    an inner isolation plate comprising a hub;
    a plurality of dampers connecting said outer isolator plate to said inner isolator plate;
    a plurality of springs connecting said outer isolator plate to said inner isolator plate, said dampers and said springs being connected to said outer isolator plate and said inner isolator plate at locations distinct from one another; and
    a rubber snubber to protect against collision between said outer isolator plate and said inner isolator plate.

10. The apparatus of claim 9 wherein said outer isolator plate hub and said inner isolator plate hub are disposed in offset relation to each other to compensate for the force of gravity on said isolator assembly.

11. The apparatus of claim 9 wherein said outer isolation plate comprises a plurality of ring ridges and corresponding features, said ridges offset from a central axis of said outer isolator plate by a distance approximately equal to an anticipated shifting distance resulting from the weight of a payload.

12. The apparatus of claim 9 wherein said dampers comprise hydraulic dampers.

13. The apparatus of claim 9 wherein a pair of said dampers are disposed adjacent to a pair of said springs.

14. The apparatus of claim 9 further comprising a plurality of outer mounts for mounting said plurality of dampers to said outer isolator plate and a plurality of inner mounts for mounting said plurality of dampers to said inner isolator plate.

15. The apparatus of claim 9 wherein said dampers are pivotally connected to said inner isolator plate.

16. The apparatus of claim 9 wherein said hub of said inner isolator plate is connectedly disposed between said inner damper mount and said inner isolator plate.

17. A method for isolating and protecting an object from the unwanted effect of forces comprising the steps of:
    constructing isolator assemblies by:
        providing an outer isolator plate comprising a plurality of ring ridges and corresponding features, said ridges offset from a central axis of said outer isolator plate by a distance approximately equal to an anticipated shifting distance resulting from the weight of a payload;

providing an inner isolator plate; and providing a plurality of springs and dampers to connect the outer isolator plate to the inner isolator plate, said springs and dampers connected to said outer isolator plate and said inner isolator plate at distinct locations;

disposing the object between isolator assemblies; and connecting the isolator assemblies to a yoke.

18. The method of claim 17 further comprising the step of providing two arms on the yoke and disposing the isolator assemblies between the two arms.

* * * * *